United States Patent
Li

(10) Patent No.: US 11,765,023 B2
(45) Date of Patent: Sep. 19, 2023

(54) CONFIGURATION METHOD AND APPARATUS FOR TRANSMISSION CONFIGURATION INDICATION

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 326 days.

(21) Appl. No.: 17/263,639

(22) PCT Filed: Jul. 27, 2018

(86) PCT No.: PCT/CN2018/097665
§ 371 (c)(1),
(2) Date: Jan. 27, 2021

(87) PCT Pub. No.: WO2020/019351
PCT Pub. Date: Jan. 30, 2020

(65) Prior Publication Data
US 2021/0168030 A1 Jun. 3, 2021

(51) Int. Cl.
*H04W 72/23* (2023.01)
*H04L 41/0803* (2022.01)
(Continued)

(52) U.S. Cl.
CPC ........ *H04L 41/0803* (2013.01); *H04L 5/0048* (2013.01); *H04W 72/23* (2023.01); *H04W 76/10* (2018.02)

(58) Field of Classification Search
CPC .. H04L 41/0803; H04L 5/0048; H04W 76/10; H04W 72/23
(Continued)

(56) References Cited

U.S. PATENT DOCUMENTS 11,356,222 B2 * 6/2022 Gao ................. H04W 24/10
11,546,867 B2 * 1/2023 Li ................. H04W 74/0833
(Continued)

FOREIGN PATENT DOCUMENTS

CN 102958045 A 3/2013
CN 105991263 A 10/2016
(Continued)

OTHER PUBLICATIONS

European Patent Office, Extended European Search Report Issued in Application No. 18927634.8, dated Jul. 1, 2021, 14 pages.
(Continued)

*Primary Examiner* — Christopher R Crompton
(74) *Attorney, Agent, or Firm* — Finnegan, Henderson, Farabow, Garrett & Dunner, L.L.P.

(57) ABSTRACT

The present disclosure provides a configuration method and apparatus for transmission configuration indication (TCI). The method includes: after a radio resource control (RRC) connection is established with a terminal, sending activation signaling to the terminal; the activation signaling being used for activating all TCI states included in a target TCI group, and the target TCI group including a plurality of TCI states; sending configuration signaling to the terminal, the configuration signaling being used for instructing the terminal to use a target receiver beam to receive a physical downlink channel scheduled by the configuration signaling, the target receiver beam being a receiver beam corresponding to a reference signal corresponding to a target TCI state, and the target TCI state being one of the TCI states indicated by the configuration signaling in the target TCI group.

20 Claims, 11 Drawing Sheets

(51) Int. Cl.
*H04W 76/10* (2018.01)
*H04L 5/00* (2006.01)

(58) Field of Classification Search
USPC .......................................................... 370/254
See application file for complete search history.

(56) References Cited

U.S. PATENT DOCUMENTS

| | | | |
|---|---|---|---|
| 2014/0177500 A1 | 6/2014 | Han et al. | |
| 2016/0309417 A1 | 10/2016 | Han et al. | |
| 2019/0253308 A1* | 8/2019 | Huang | H04L 43/0823 |
| 2019/0306915 A1* | 10/2019 | Jin | H04W 72/54 |
| 2019/0326969 A1* | 10/2019 | Jiang | H04B 7/0817 |
| 2020/0280416 A1 | 9/2020 | Gao et al. | |

FOREIGN PATENT DOCUMENTS

| | | |
|---|---|---|
| CN | 108024268 A | 5/2018 |
| CN | 108092754 A | 5/2018 |
| CN | 108199819 A | 6/2018 |
| EP | 3 713 130 A1 | 9/2020 |
| WO | WO 2017/074156 A1 | 5/2017 |

OTHER PUBLICATIONS

ISA State Intellectual Property Office of the People's Republic of China, Written Opinion of the International Searching Authority Issued in Application No. PCT/CN2018/097665, dated Apr. 23, 2019, WIPO, 9 pages.
ZTE, Sanechips, "Details and evaluation results on beam indication", R1-1719538, 3GPP TSG RAN WG1 Meeting #91, Reno, USA, Nov. 27-Dec. 1, 2017, 11 pages.
Samsung, "On Beam Management, Measurement and Reporting", R1-1720290, 3GPP TSG RAN WG1 Meeting 91, Reno, USA, Nov. 27-Dec. 1, 2017, 15 pages.
3GPP TS 38.214 V15.2.0 (Jun. 2018), "3rd Generation Partnership Project; Technical Specification Group Radio Access Network; NR; Physical layer procedures for data (Release 15)"; Jun. 30, 2018, 95 pages.
3GPP TS 38.321 V15.2.0 (Jun. 2018), "3rd Generation Partnership Project; Technical Specification Group Radio Access Network; NR; Medium Access Control (MAC) protocol specification (Release 15)", Jun. 20, 2018, 73 pages.
State Intellectual Property Office of the People's Republic of China, Office Action and Search Report issued in Application No. 202110667770.1, dated Jun. 2, 2022, 16 pages.
State Intellectual Property Office of the People's Republic of China, Office Action and Search Report issued in Application No. 202110667770.1, dated Nov. 4, 2022, 18 pages.
European Patent Office, Office Action issued in Application No. 18927634.8, dated Apr. 19, 2022, 8 pages.
State Intellectual Property Office of the People's Republic of China, Office Action and Search Report Issued in Application No. 2018800016561, dated Sep. 4, 2020, 15 pages.
ISA State Intellectual Property Office of the People's Republic of China, International Search Report Issued in Application No. PCT/CN2018/097665, dated Apr. 23, 2019, WIPO, 4 pages.

* cited by examiner

US 11,765,023 B2

CONFIGURATION METHOD AND APPARATUS FOR TRANSMISSION CONFIGURATION INDICATION

CROSS REFERENCE TO RELATED APPLICATIONS

This application is a national phase application based on International Application No. PCT/CN2018/097665, filed Jul. 27, 2018, the content of which is incorporated herein by reference.

TECHNICAL FIELD

The present disclosure relates to the field of communication, and in particular to methods and devices of configuring transmission configuration indication.

BACKGROUND

Standardization related to 5G systems, namely New Radio (NR) systems, is under discussion of 3rd Generation Partnership Project (3GPP).

In the 5G systems, after a terminal finishes a random access with a base station and establishes a Radio Resource Control (RRC) connection with the base station, the base station may determine a plurality of Transmission Configuration Indication (TCI) states for the terminal according to measurement results reported by the terminal. Each TCI state indicates a spatial Rx parameter in a case of its QCL (Quasi-Co-Location) type being type D, that is, it indicates a receiving beam of the terminal. At present, the number of TCI states is up to 64.

Currently, for receiving a Physical Downlink Shared Channel (PDSCH), the base station needs to, after configuring up to 64 TCI states with an RRC signaling, use an activation signaling, such as Media Access Control Element (MAC CE), to activate any 8 TCI states among the up to 64 TCI states. In a case that each TCI state corresponds to 1 bit of the MAC CE, up to 64 bits of the MAC CE are required to activate 8 TCI states of the up to 64 TCI states, which results in a relatively great signaling overhead of the MAC CE.

SUMMARY

In order to overcome the problems in the related art, embodiments of the present disclosure provide methods and devices of configuring transmission configuration indication.

According to a first aspect of the present disclosure, there is provided a method for configuring transmission configuration indication, which is applicable to a base station and includes:

transmitting, after establishing a Radio Resource Control (RRC) connection with a terminal, an activation signaling to the terminal, wherein the activation signaling is to activate all TCI states of a target TCI group, and the target TCI group includes a plurality of TCI states; and transmitting a configuration signaling to the terminal, wherein the configuration signaling is to instruct the terminal to receive a physical downlink channel scheduled by the configuration signaling through a target receiving beam, the target receiving beam is a receiving beam for a reference signal corresponding to a target TCI state, and the target TCI state is a TCI state of the target TCI group indicated by the configuration signaling.

In some embodiments of the present disclosure, before transmitting the activation signaling to the terminal, the method further includes:

transmitting, through a target RRC signaling, a TCI state correspondence table to the terminal, wherein the TCI state correspondence table includes a correspondence between a TCI state identifier and a signal identifier, the TCI state identifier comprises a state identifier of each TCI state, and the signal identifier comprises an identifier of a reference signal for a current TCI state.

In some embodiments of the present disclosure, the target RRC signaling further includes grouping indication information which indicates a TCI group corresponding to each TCI state identifier in the TCI state correspondence table.

In some embodiments of the present disclosure, transmitting the activation signaling to the terminal includes:

transmitting, to the terminal, an activation signaling which indicates whether all TCI states of each TCI group are activated.

In some embodiments of the present disclosure, transmitting the configuration signaling to the terminal includes:

determining a serial number of each TCI state in the target TCI group by sorting all the TCI state of the target TCI group in an ascending order of the TCI state identifiers;

determining a target serial number of the target TCI state; and transmitting, to the terminal, a configuration signaling carrying the target serial number.

According to a second aspect of the present disclosure, there is provided a method for configuring a transmission configuration indication (TCI), which is applicable to a terminal, and includes:

receiving, after establishing a radio resource control (RRC) connection with a base station, an activation signaling from the base station;

activating all TCI states of a target TCI group indicated by the activation signaling, wherein the target TCI group includes a plurality of TCI states;

determining a target receiving beam after receiving a configuration signaling from the base station, wherein the target receiving beam is a receiving beam for a reference signal corresponding to a target TCI state, and the target TCI state is a TCI state of the target TCI group indicated by the configuration signaling;

receiving, through the target receiving beam, a physical downlink channel scheduled by the configuration signaling.

In some embodiments of the present disclosure, before receiving the activation signaling from the base station, the method further includes:

receiving, through a target RRC signaling, a TCI state correspondence table from the base station, wherein the TCI state correspondence table includes a correspondence between a TCI state identifier and a signal identifier, the TCI state identifier comprises a state identifier of each TCI state, and the signal identifier comprises an identifier of a reference signal for a current TCI state.

In some embodiments of the present disclosure, the target RRC signaling further includes grouping indication information which indicates a TCI group corresponding to each TCI state identifier in the TCI state correspondence table.

In some embodiments of the present disclosure, determining the target receiving beam after receiving the configuration signaling from the base station includes:
  determining a serial number of each TCI state of the target TCI group by sorting all TCI states of the target TCI group in an ascending order of TCI state identifiers;
  determining a TCI state whose serial number matches a target serial number carried by the configuration signaling, as a target TCI state;
  determining a target signal identifier which corresponds to a target TCI state identifier of the target TCI state from the TCI state correspondence table; and
  determining a receiving beam for receiving a target reference signal as the target receiving beam, the target reference signal is a reference signal indicated by the target signal identifier.

According to a third aspect of the present disclosure, there is provided a device for configuring transmission configuration indication, which is applicable to a base station and includes:
  a first transmitting module, configured to transmit, after establishing a radio resource control (RRC) with a terminal, an activation signaling to the terminal, wherein the activation signaling is to activate all TCI states of a target TCI group and the target TCI group includes a plurality of TCI states; and
  a second transmitting module, configured to transmit, a configuration signaling to the terminal, wherein the configuration signaling is to instruct the terminal to receive a physical downlink channel scheduled by the configuration signaling through a target receiving beam, the target receiving beam is a receiving beam for a reference signal corresponding to a target TCI state, and the target TCI state is a TCI state of the target TCI group indicated by the configuration signaling.

In some embodiments of the present disclosure, the device further includes:
  a third transmitting module, configured to transmit, and through a target RRC signaling, a TCI state correspondence table to the terminal, wherein the TCI state correspondence includes a correspondence between a TCI state identifier and a signal identifier, the TCI state identifier comprises a state identifier of each TCI state, and the signal identifier comprises an identifier of a reference signal for a current TCI state.

In some embodiments of the present disclosure, the target RRC signaling further includes grouping indication information which indicates a TCI group corresponding to each TCI state identifier in the TCI state correspondence table.

In some embodiments of the present disclosure, the first transmitting module includes:
  a first transmitting sub-module, configured to transmit an activation signaling to the terminal, wherein the activation signaling indicates whether all TCI states of each TCI group are activated.

In some embodiments of the present disclosure, the second transmitting module includes:
  a first determining sub-module, configured to determine a serial number of each TCI state of the target TCI group by sorting all the TCI state included in the target TCI group in an ascending order of the TCI state identifiers;
  a second determining sub-module, configured to determine a serial number of the target TCI state; and
  a second transmitting sub-module, configured to transmit a configuration signaling carrying the target serial number to the terminal.

According to a fourth aspect of the present disclosure, there is provided a device for configuring transmission configuration indication, which is applicable to a terminal and includes:
  a first receiving module, configured to receive, after establishing a radio resource control (RRC) connection with a base station, an activation signaling from the base station;
  an activating module, configured to activate all TCI states of a target TCI group indicated by the activation signaling, wherein the target TCI group includes a plurality of TCI states corresponding to the terminal;
  a determining module, configured to determine a target receiving beam after receiving a configuration signaling from the base station, wherein the target receiving beam is a receiving beam for a reference signal corresponding to a target TCI state, and the target TCI state is a TCI state of the target TCI group indicated by the configuration signaling; and
  a second receiving module, configured to receive, through the target receiving beam, a physical downlink channel scheduled by the configuration signaling.

In some embodiments of the present disclosure, the device further includes:
  a third receiving module, configured to receive, through a target RRC signaling, a TCI state correspondence table from the base station, wherein the TCI state correspondence table includes a correspondence between a TCI state identifier and a signal identifier, the TCI state identifier comprises a state identifier of each TCI state, and the signal identifier comprises an identifier of a reference signal for a current TCI state.

In some embodiments of the present disclosure, the target RRC signaling further includes grouping indication information which indicates a TCI group corresponding to each TCI state identifier in the TCI state correspondence table.

In some embodiments of the present disclosure, the determining module includes:
  a third determining sub-module, configured to determine a serial number of each TCI state of the target TCI group by sorting all TCI states of the target TCI group in an ascending order of the TCI state identifiers;
  a fourth determining sub-module, configured to determine a TCI state, whose serial number matches a target serial number carried by the configuration signaling, as the target TCI state;
  a fifth determining sub-module, configured to determine a target signal identifier corresponding to a target TCI state identifier of the target TCI state according to the TCI state correspondence table; and
  a sixth determining sub-module, configured to determine a receiving beam for receiving a target reference signal as a target receiving beam, wherein the target reference signal is a reference signal indicated by the target signal identifier.

According to a fifth aspect of the present disclosure, a computer-readable storage medium is provided, the computer-readable storage medium stores a computer program, wherein the method for configuring transmission configuration indication according to the first aspect is performed in a case that the computer program is executed.

According to a sixth aspect of the present disclosure, a computer-readable storage medium is provided, the computer-readable storage medium stores a computer program, wherein the method for configuring transmission configuration indication according to the second aspect is performed in a case that the computer program is executed.

According to a seventh aspect of the present disclosure, there is provided an apparatus for configuring transmission configuration indication, which is applicable to a base station and includes:
- a processor;
- a memory configured to store instructions executable by the processor;
- wherein the processor is configured to:
- transmit, and after establishing a radio resource control (RRC) connection with a terminal, an activation signaling to the terminal, wherein the activation signaling is to activate all TCI states included in a target TCI group, and the target TCI group includes a plurality of TCI states; and
- transmit a configuration signaling to the terminal, wherein the configuration signaling is to instruct the terminal to receive a physical downlink channel scheduled by the configuration signaling through a target receiving beam, the target receiving beam is a receiving beam for a reference signal corresponding to a target TCI state, and the target TCI state is a TCI state of the target TCI group indicated by the configuration signaling.

According to an eighth aspect of the present disclosure, there is provided an apparatus for configuring transmission configuration indication, which is applicable to a terminal and includes:
- a processor;
- a memory configured to store processor instructions executable by the processor;
- wherein the processor is configured to:
- receive, after establishing a radio resource control (RRC) connection with a base station, an activation signaling from the base station;
- activate all TCI states of a target TCI group indicated by the activation signaling; wherein the target TCI group includes a plurality of TCI states;
- determine a target receiving beam after receiving a configuration signaling from the base station, wherein the target receiving beam is a receiving beam for a reference signal corresponding to a target TCI state and the target TCI state is a TCI state of the target TCI group indicated by the configuration signaling; and
- receiving, through the target receiving beam, a physical downlink channel scheduled by the configuration signaling.

The technical solutions provided by the embodiments of the present disclosure may produce following beneficial effects:

In embodiments of the present disclosure, the base station may transmit an activation signaling to a terminal after establishing an RRC connection with the terminal, thereby activating all TCI states of a target TCI group. And then, the base station transmits a configuration signaling to the terminal to designate a receiving beam for a reference signal corresponding to a target TCI state in the activated target TCI group as a target receiving beam, such that the terminal may receive, through the target receiving beam, a physical downlink channel scheduled by the configuration signaling. In the above process, by grouping TCI states, whether each TCI group is activated or not may be indicated by a smaller number of bits in the activation signaling. Once a target TCI group is activated, all TCI states of the target TCI group are activated, which reduces overhead of the activation signaling and saves resources of the base station.

In embodiments of the present disclosure, a base station may transmit a TCI state correspondence table to a terminal through a target RRC signaling before transmitting an activation signaling to the terminal, wherein the TCI state correspondence table includes a correspondence between a TCI state identifier and a signal identifier, the TCI state identifier comprises a state identifier of each TCI state, and the signal identifier comprises an identifier of a reference signal for a current TCI state. In the embodiment of the present disclosure, the base station transmits the TCI state correspondence table to the terminal, so that the terminal can subsequently determine a target receiving beam for receiving the physical downlink channel scheduled by the configuration signaling according to the TCI state correspondence table, with high availability.

In embodiments of the present disclosure, a base station may further transmit a grouping indication information to a terminal through a target RRC signaling, so that the terminal can determine TCI states of each TCI group from the TCI state correspondence table according to the grouping indication information, and the base station may subsequently indicate whether each TCI group is activated or not with a smaller number of bits in the activation signaling, and all TCI states of a target TCI group are activated upon that the target TCI group is activated. Thus, overhead of the activation signaling is reduced.

In embodiments of the present disclosure, the base station may transmit an activation signaling that indicates whether all TCI states of each TCI group are activated, so that the terminal may determine, after receiving the activation signaling, that all the TCI states of the activated target TCI group are activated. Thus, overhead of the activation signaling is reduced and resources of the base station are saved.

In embodiments of the present disclosure, a base station may determine a serial number for each TCI state of the target TCI group by sorting all TCI states of the target TCI group in an ascending TCI state identifiers. Further, a target serial number corresponding to the target TCI state may be determined. The base station may transmit the target serial number to the terminal through a configuration signaling. The terminal may determine a corresponding target TCI state according to the target serial number and further determine a target receiving beam. Through the above process, after activating the target TCI group, the base station may enable, through the configuration signaling, the terminal to quickly determine a target TCI state in the activated target TCI group. Overhead of the activation signaling is also saved while guaranteeing services of the terminal.

In embodiments of the present disclosure, after establishing an RRC connection with a base station, a terminal may receive an activation signaling from the base station and activate all TCI states of a target TCI group according to the activation signaling. Further, according to the received configuration signaling, the terminal may determine a target TCI state of the target TCI group and determine a receiving beam for a reference signal corresponding to the target TCI state as a target receiving beam. The terminal may receive a physical downlink channel scheduled by the configuration signaling through the target receiving beam. In the above process, by grouping the TCI states, a base station may use a smaller number of bits in the activation signaling to indicate whether each TCI group is activated, and a terminal may activate all TCI states of a target TCI group according to the activation signaling, thereby reducing overhead of the activation signaling and saving resources of the base station.

In embodiments of the present disclosure, the terminal may receive, before receiving an activation signaling from the base station, a TCI state correspondence table from the base station and through a target RRC signaling. The TCI state correspondence table includes a correspondence between a TCI state identifier and a signal identifier, the TCI state identifier comprises a state identifier of each TCI state, and the signal identifier comprises an identifier of a reference signal for a current TCI state. Thus, it is convenient for the terminal to subsequently determine a target receiving beam for receiving the physical downlink channel scheduled by a configuration signaling according to the TCI state correspondence table, and the availability is high.

In embodiments of the present disclosure, the terminal may further receive a target RRC signaling including group indication information, so that the terminal may determine TCI states of each TCI group from the TCI state correspondence table according to the grouping indication information, and the base station may subsequently indicate whether each TCI group is activated or not with a smaller number of bits in an activation signaling, and all TCI states of a target TCI group are activated in response to that the target TCI group is activated, thereby reducing overhead of activation signaling.

In embodiments of the present disclosure, the terminal may determine a serial number for each TCI state in the target TCI group by sorting all TCI states of an activated target TCI group according to an ascending order of TCI state identifiers. A TCI state whose serial number matches the target serial number carried by the configuration signaling is determined as a target TCI state, such that a target TCI state and a corresponding target signal identifier may be quickly determined in the target TCI group according to the previously received TCI state correspondence table. A reference signal indicated by the target signal identifier is a target reference signal, and the terminal takes a receiving beam for receiving the target reference signal as the target receiving beam. Through the above process, the terminal may quickly determine, after a target TCI group being activated, a target TCI state in the activated target TCI group, and finally determine a target receiving beam. Thus, overhead of activation signaling is reduced and resources of the base station are saved while guaranteeing services of the terminal.

It should be understood that the above general description and the following detailed description are only exemplary and explanatory and cannot be construed as a limit to the present disclosure.

BRIEF DESCRIPTION OF THE DRAWINGS

Figures which are incorporated in and constitute a part of the specification illustrate embodiments consistent with the present disclosure, and serve together with the description to explain the principles of the present disclosure.

DETAILED DESCRIPTION OF THE EMBODIMENTS

Exemplary embodiments will be described in detail hereinafter, and examples thereof are illustrated in the accompanying drawings. In a case that the following description refers to the drawings, unless otherwise stated, the same numbers in different drawings designate the same or similar elements. The implementation manners described in the following exemplary embodiments do not represent all implementation manners consistent with the present disclosure. Rather, they are just examples of devices and methods consistent with some aspects of the present disclosure as defined in the appended claims.

Terms used in the present disclosure are only for the purpose of describing specific embodiments, and are not intended to limit the present disclosure. Singular forms "a", "said" and "the" used in the present disclosure and appended claims are also intended to include plural forms, unless the context clearly indicates other meanings. It should further be understood that the term "and/or" used herein refers to and includes any or all possible combinations of one or more associated listed items.

It should be understood that although the terms "first", "second", "third", etc. may be used in this disclosure to describe various information, the information should not be limited by these terms. These terms are only used to distinguish information of same type from each other. For example, without departing from the scope of the present disclosure, the first information may also be referred to as second information, and similarly, the second information may also be referred to as first information. Depending on the context, the word "if" as used herein may be interpreted as "at the time that" or "upon that" or "in response to determination".

Figure 1:
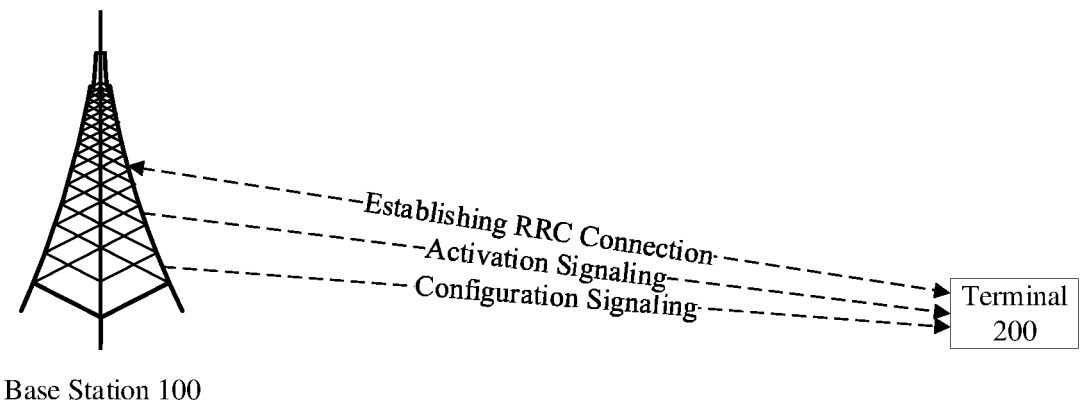
FIG. 1 is a schematic diagram illustrating a scenario of configuring transmission configuration indication according to an exemplary embodiment of the present disclosure.

FIG. 1 illustrates a schematic diagram of a scenario of configuring transmission configuration indication according to at least one embodiment of the present disclosure. A base station 100 may transmit, to a terminal 200 and after establishing a radio resource control (RRC) connection with the terminal 200, an activation signaling. The terminal 200 activates all TCI states of a target TCI group among a plurality of TCI groups according to the activation signaling. Further, the base station 100 may transmit a configuration signaling to the terminal 200, wherein a target TCI state is indicated in a target TCI group, and the terminal may receive a physical downlink channel scheduled by the configuration signaling through a receiving beam for a reference signal corresponding to the TCI state.

In the above embodiment, by grouping the TCI states, it is possible to indicate whether each TCI group is activated with a smaller number of bits in the activation signaling. Once the target TCI group is activated, all TCI states of the target TCI group are activated, which reduces overhead of the activation signaling and saves resources of the base station.

A method for configuring transmission configuration indication according to embodiments of the present disclosure is first descripted from a base station side hereinafter.

Figure 2:
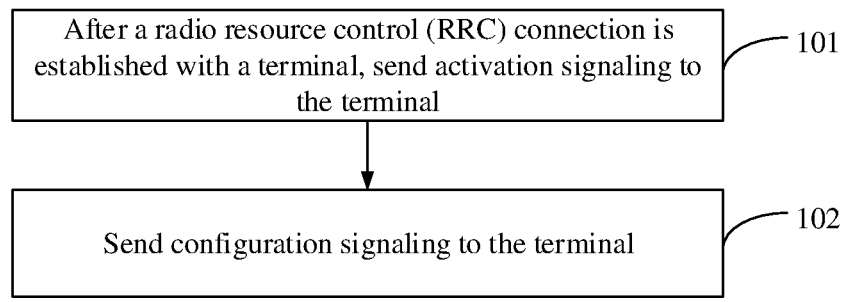
FIG. 2 is a flow chart illustrating a method for configuring transmission configuration indication according to an exemplary embodiment of the present disclosure.

Embodiments of the present disclosure provide a method for configuring transmission configuration indication, which is applicable to a base station. Referring to FIG. 2, a flow chart of a method for configuring transmission configuration indication according to an exemplary embodiment of the present disclosure is illustrated, and the method may include following steps:

In Step 101, after establishing a radio resource control (RRC) connection with a terminal, an activation signaling is transmitted to the terminal, wherein the activation signaling is used to activate all TCI states of a target TCI group, and the target TCI group includes a plurality of TCI states;

In Step 102, a configuration signaling is transmitted to the terminal. The configuration signaling is to instruct the terminal to receive, through a target receiving beam, a physical downlink channel scheduled by the configuration signaling, and the target receiving beam is a receiving beam for a reference signal corresponding to a target TCI state, and the target TCI state is a TCI state of the target TCI group indicated by the configuration signaling.

In the above-mentioned embodiment, after establishing the RRC connection with the terminal, the base station may transmit the activation signaling to the terminal, thereby activating all TCI states of the target TCI group. Furthermore, the base station transmits a configuration signaling to the terminal to activate the target TCI group. The receiving beam for the reference signal corresponding to the target TCI state of the TCI group is the target receiving beam, so that the terminal receives the physical downlink channel scheduled by the configuration signaling through the target receiving beam. In the above process, by grouping the TCI states, a smaller number of bits in the activation signaling may be used to indicate whether each TCI group is activated. Once the target TCI group is activated, all TCI states of the target TCI group are activated, which reduces overhead of the activation signaling and saves resources of the base station.

For the above Step 101, the base station may first transmit measurement configuration information to the terminal according to related technologies, and the measurement configuration information is to instruct the terminal to report a beam measurement result to the base station. The base station determines a TCI state set according to the beam measurement result reported by the terminal.

The beam measurement result may include a Reference Signal (RS) identifier corresponding to a beam and Layer 1-Reference Signal Receiving Power (L1-RSRP, physical layer reference signal receiving power), etc. The RS identifier may include a RS type and an index number, wherein the RS type indicates that the reference signal may be a Synchronization Signal Block (SSB) or a channel state information reference signal (CSI-RS).

In this step, after establishing the RRC connection with the terminal, the base station may transmit the activation signaling to the terminal. The activation signaling is to activate all TCI states of a target TCI group, and the target TCI group includes a plurality of TCI states. In some embodiments of the present disclosure, the activation signaling may be an MAC CE signaling.

In the embodiments of the present disclosure, in order to reduce overhead of the activation signaling, all TCI states corresponding to the terminal may be grouped. In some embodiments of the present disclosure, TCI states with close spatial information may be grouped into one group, that is to say, TCI states corresponding to a plurality of RSs with close beam directions that are used by the base station for transmitting RSs are grouped into one group, or TCI states corresponding to reference signals that are received by a terminal through beams with close directions are grouped into one group. Serial numbers of the TCI states of one group may be adjacent.

Figure 3A:
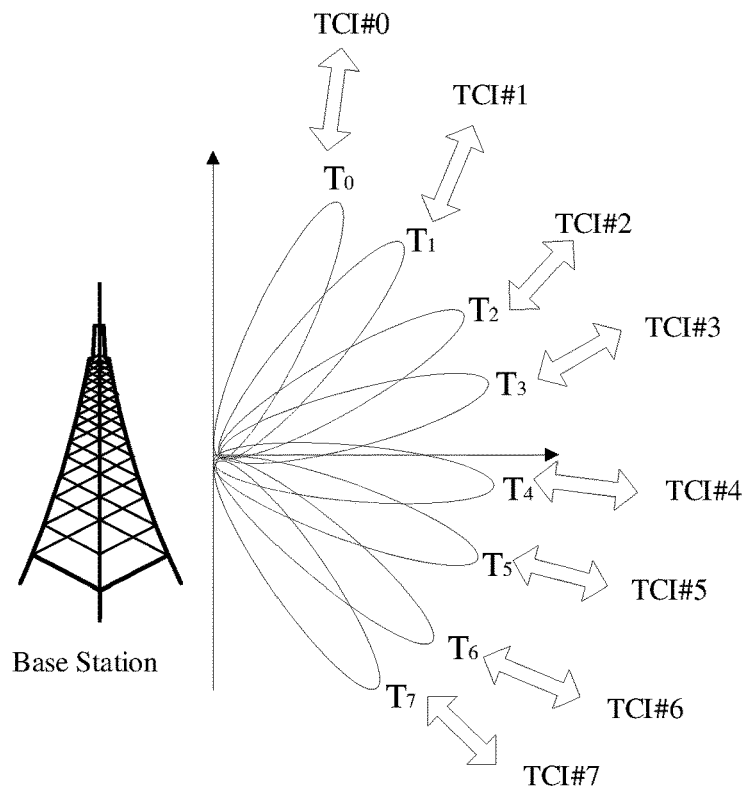
FIG. 3A and FIG. 3B are schematic diagrams illustrating scenarios of configuring transmission configuration indication according to an exemplary embodiment of the present disclosure.

As illustrated in FIG. 3A, TCI states TCI #0, TCI #1, TCI #2, TCI #3 for respective RSs corresponding to transmitting beams $T_0$, $T_1$, $T_2$, and $T_3$ that are used by the base station to transmit RSs and have close directions are grouped into one group, and TCI states TCI #4, TCI #5, TCI #6. TCI #7 for respective RSs corresponding to transmitting beams $T_4$, $T_5$, $T_6$, and $T_7$ that are used by the base station to transmit RSs and have close directions are grouped into another group.

Figure 3B:
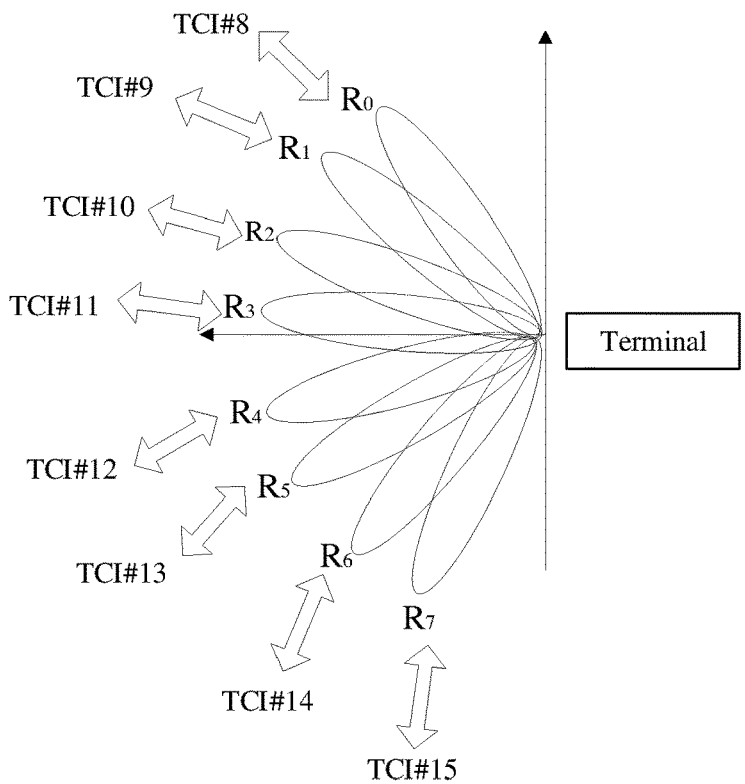

Or, as illustrated in FIG. 3B, TCI states TCI #8, TCI #9, TCI #10 for respective RSs corresponding to receiving beams $R_0$, $R_1$, $R_2$, and $R_3$ that are used by the terminal to receive RSs and have close directions are grouped into one group, and TCI states TCI #12, TCI #13, TCI #14 and TCI #15 for respective RSs corresponding to receiving beams $R_4$, $R_5$, $R_6$, and $R_7$ that are used by the terminal to receive RSs and have close directions are grouped into another group.

In the embodiments of the present disclosure, optionally, each TCI group includes the same number of TCI states, for example, each TCI group includes 2, 4, or 8 TCI states. In view of that MAC CE signaling typically activates 8 TCI states, therefore, in the embodiments of the present disclosure, each TCI group may include up to 8 TCI states.

In addition, in the embodiments of the present disclosure, different TCI groups may not share a common TCI state, or they may share a common TCI state. The number of the TCI states shared by any two TCI groups should be less than the total number of TCI states of each TCI group.

For example, in a case that 4 TCI states are grouped into one group, the total number of TCI states of each TCI group is 4, then the first group may include TCI #0, TCI #1, TCI #2, and TCI #3, and the second group may include TCI #4, TCI #5, TCI #6, and TCI #7.

Or, the first group may include TCI #0, TCI #1, TCI #2, and TCI #3, and the second group may include TCI #3, TCI #4, TCI #5, and TCI #6. The number of the TCI states shared by the two TCI groups is 1, and the shared TCI state is TCI #3.

In a case of transmitting an activation signaling to the terminal, the base station may transmit, to the terminal, the activation signaling which indicates whether all TCI states of each TCI group are activated, so that the terminal may determine a target TCI group to be activated among all TCI groups according to the activation signaling, so as to activate all TCI states of the target TCI group.

If the 64 TCI states are divided into N groups, N bits are needed to indicate which target TCI group is activated. A value 1 of a current bit indicates that all TCI states of the target TCI group are activated, and a value 0 of the current bit indicates that no TCI states of the TCI group are activated. Or a value 1 indicates that no TCI states of the TCI group are activated, and a value 0 indicates that all TCI states of the target TCI group are activated, which is not limited in the present disclosure.

For example, each TCI group includes 4 TCI states, and any two TCI groups do not share any TCI state, then the 64 TCI states are divided into 16 groups, and the activation signaling MAC CE needs to transmit 16 bits to a terminal so that the terminal may determine a target TCI group that needs to be activated. Assuming that the first group and the third group are to be activated, the 16-bit values transmitted by the base station through the MAC CE are 0000 0000 0000 0101 in sequence, and from right to left, it is indicated that the target TCI groups that need to be activated are the first group and the third group.

In a case that the first target TCI group include TCI #0, TCI #1, TCI #2, TCI #3, and the third target TCI group include TCI #8, TCI #9, TCI #10, and TCI #11, the base station transmits the above 16 bits to the terminal through the MAC CE, and the terminal may determine that all TCI states of the target TCI groups need to be activated, that is, the TCI states to be activated include: TCI #0, TCI #1, TCI #2, TCI #3, TCI #8. TCI #9, TCI #10, and TCI #11.

Through the above process, it can be seen that in the related technology, the activation signaling MAC CE is required to transmit 64 bits to the terminal, so as to enable the terminal to determine 8 TCI states to be activated. With the method provided by the embodiment of the present disclosure, in a case that any two TCI groups does not share any TCI state, the activation signaling MAC CE only needs to transmit N bits to the terminal, and the terminal may activate all TCI states in the target TCI group, where N=64/X, X indicates the number of TCI states of each TCI group, and may be 2, 4, or 8. Therefore, the base station only needs to transmit fewer bits to enable the terminal to activate 8 TCI states of the 64 TCI states, which reduces overhead of the activation signaling.

Figure 4:
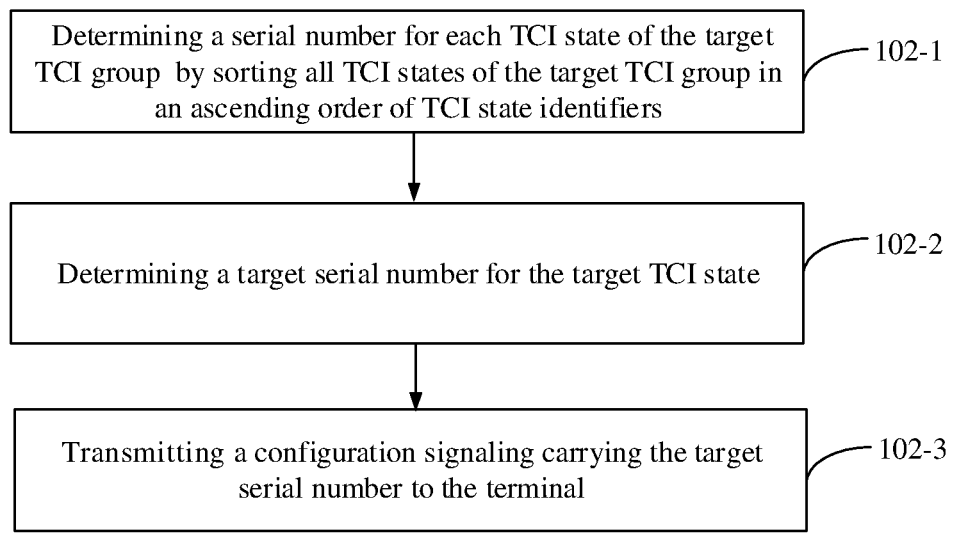
FIG. 4 is a flow chart illustrating a method for configuring transmission configuration indication according to another exemplary embodiment of the present disclosure.

For the foregoing Step 102, in some embodiments of the present disclosure, as illustrated in FIG. 4, which illustrates a flowchart of another method for configuring transmission configuration indication according to the embodiment illustrated in FIG. 2, Step 102 may include following steps:

In step 102-1, a serial number for each TCI state of the target TCI group is determined by sorting all TCI states of the target TCI group in an ascending order of TCI state identifiers.

In this step, after determining the target TCI group, the base station may determine a serial number for each TCI state of the target TCI group by sorting all the TCI states of the target TCI group in an ascending order of TCI state identifiers.

Assuming that the target TCI group is the first TCI group and the third TCI group, all TCI states to be activated include TCI #0, TCI #1, TCI #2, TCI #3, TCI #8, TCI #9, TCI #10, and TCI #11. A correspondence between a state identifier of each TCI state to be activated and a serial number is illustrated in Table 1.

TABLE 1

| Target TCI group | TCI state identifier | Serial number |
|---|---|---|
| First group | TCI#0 | 0 |
|  | TCI#1 | 1 |
|  | TCI#2 | 2 |
|  | TCI#3 | 3 |
| Third group | TCI#8 | 4 |
|  | TCI#9 | 5 |
|  | TCI#10 | 6 |
|  | TCI#11 | 7 |

In Step 102-2, a target serial number for the target TCI state is determined.

In this step, the base station may determine a target serial number for the target TCI state according to Table 1. For example, in response to determining that the target TCI state is TCI #9, a target serial number is determined as 5.

In step 102-3, a configuration signaling carrying the target serial number is transmitted to the terminal.

In this step, the base station may transmit a configuration signaling carrying the target serial number to the terminal. In some embodiments of the present disclosure, the configuration signaling may be a Downlink Control Information (DCI) signaling.

In the embodiment of the present disclosure, in order to carry the target serial number in the configuration signaling, the target serial number may be converted according to the binary in the related technology so as to obtain a target binary value. Thus, the configuration signaling only needs to carry the target binary value. For example, the target serial number is 5, and the target binary value obtained after binary conversion is 101.

After receiving the configuration signaling, the terminal may determine among the 8 activated TCI states that the target TCI state is TCI #9 according to the target serial number carried in the configuration signaling. Further, a receiving beam corresponding to TCI #9 may be taken as a target receiving beam for receiving a physical downlink channel scheduled by the DCI signaling. The physical downlink channel may be a physical downlink control channel (PDCCH) or a physical downlink shared channel (PDSCH).

In the above embodiment, after activating the target TCI group, the base station may enable the terminal to quickly determine a TCI state of the activated target TCI group through the configuration signaling, that is, a target TCI state. Overhead of the activation signaling is saved while guaranteeing terminal services.

Figure 5:
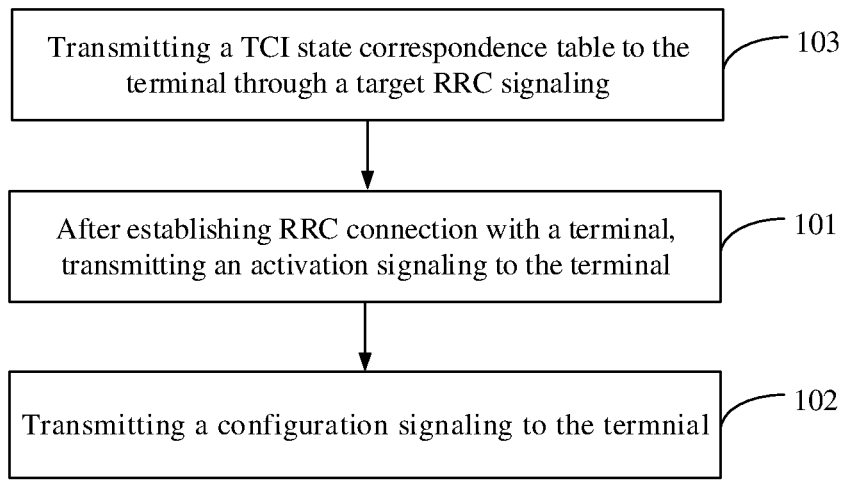
FIG. 5 is a flowchart illustrating a method for configuring transmission configuration indication according to still another exemplary embodiment of the present disclosure.

In some embodiments of the present disclosure, the method for configuring transmission configuration indication is illustrated in FIG. 5. FIG. 5 illustrates a flowchart of another method for configuring transmission configuration indication according to the embodiment illustrated in FIG. 2. Before transmitting the activation signaling to the terminal, the method further includes the following steps:

In Step 103, a TCI state correspondence table is transmitted to the terminal through a target RRC signaling.

In some embodiment of the present disclosure, the TCI state correspondence table includes a correspondence between a TCI state identifier and a signal identifier, the TCI state identifier comprises a state identifier of each TCI state, and the signal identifier comprises an identifier of a reference signal for a current TCI state. The signal identifier may include a reference signal type and an index number, and the reference signal type indicates that the reference signal may be SSB or CSI-RS. The TCI state correspondence table may be as illustrated in Table 2.

TABLE 2

| TCI state identifier | Signal identifier |
|---|---|
| TCI#0 | SSB index#1 |
| TCI#1 | SSB index#2 |
| TCI#2 | CSI-RS index#5 |
| TCI#3 | CSI-RS index#6 |
| TCI#4 | SSB index#3 |
| . . . | . . . |

The base station may first transmit Table 2 to the terminal through a target RRC signaling before transmitting the activation signaling to the terminal. After the terminal receives the Table 2, in response to determining that a target TCI is TCI #3, the terminal may subsequently take a receiving beam $R_x$ for receiving CSI-RS index #6 as a target receiving beam according to Table 2, so as to receive a physical downlink channel scheduled by the configuration signaling through R. Of course, in response to determining that the target TCI is TCI #3, it may further be indicated that the base station transmits CSI-RS index #6 through a transmitting beam $T_x$ and the transmitting beam $T_x$ at the base station side corresponds to a receiving beam Rx at the terminal side, that is to say, the terminal is required to receive, through the receiving beam Rx, the physical downlink channel transmitted through the transmitting beam Tx.

In the foregoing embodiment, the base station may transmit, before transmitting the activation signaling and to the terminal, the TCI state correspondence table through the target RRC signaling. The TCI state correspondence table includes a correspondence between a TCI state identifier and a signal identifier, the TCI state identifier comprises a state identifier of each TCI state, and the signal identifier comprises an identifier of a reference signal for a current TCI state. In the embodiment of the present disclosure, the base station transmits the TCI state correspondence table to the terminal, so that the terminal can subsequently determine the target receiving beam for receiving the physical downlink channel scheduled by the configuration signaling according to the TCI state correspondence table, with high availability.

In some embodiments of the present disclosure, the base station may further transmit, to the terminal and through a target RRC signaling, grouping indication information, which indicates a TCI group corresponding to each TCI state identifier in the TCI state correspondence table, for example, as illustrated in Table 3.

| TCI state identifier | Signal identifier | Grouping indication information |
|---|---|---|
| TCI#0 | SSB index#1 | First group |
| TCI#1 | SSB index#2 | First group |
| TCI#2 | CSI-RS index#5 | First group |
| TCI#3 | CSI-RS index#6 | First group |
| TCI#4 | SSB index#3 | Second Group |
| . . . | . . . | . . . |

In the embodiment of the present disclosure, after receiving the target RRC signaling including the grouping indication information, the terminal may further determine a TCI group to which each TCI state belongs, and the base station may subsequently use a smaller number of bits in the activation signaling to indicate whether each TCI group is activated, once the target TCI group is activated, all TCI states in the target TCI group are activated, thereby reducing overhead of the activation signaling.

In some embodiments of the present disclosure, the grouping indication information is just expected to indicate the number L of TCI states grouped into one group and the number M of TCI states share by each two adjacent TCI groups. For example, in response to determining L=4 and M=0, a predefined grouping indication information is that consecutive L TCI states form a group, that is, TCI #0, TCI #1, TCI #2, and TCI #3 belong to the first group, and TCI #4, TCI #5, TCI #6, TCI #7 belong to the second group, and so on. Or, the base station is not required to transmit any grouping indication information to the terminal, that is, the values of L and M are also predefined, and the above grouping indication information is written directly into a chip of the base station and a chip of the terminal. Accordingly, the base station does not need to transmit the grouping indication information to the terminal through the target RRC signaling, and the terminal may acquire the grouping indication information from its own chip, thereby saving signaling resources for interaction between the base station and the terminal.

The following describes a method for configuring transmission configuration indication according to embodiments of the present disclosure from the terminal side.

Figure 6:
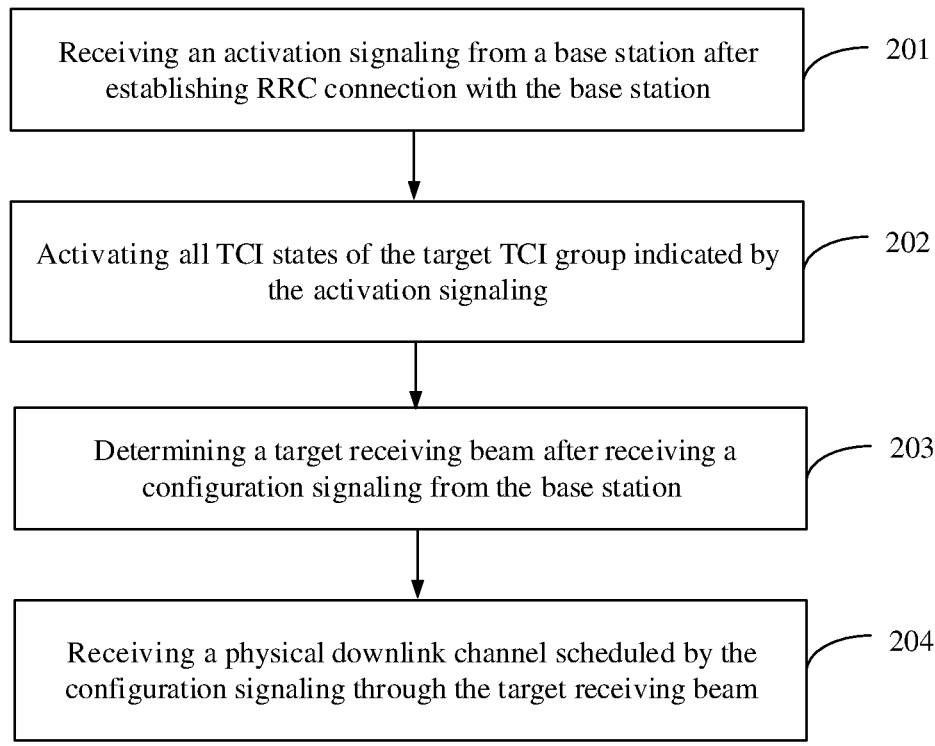
FIG. 6 is a flow chart illustrating a method for configuring transmission configuration indication according to yet another exemplary embodiment of the present disclosure.

Some embodiments of the present disclosure provide a method for configuring transmission configuration indication, which is applicable to a terminal. Referring to FIG. 6, a flowchart of a method for configuring transmission configuration indications is illustrated according to another exemplary embodiment of the present disclosure, which may include following steps:

In Step 201, after establishing a radio resource control (RRC) connection with a base station, an activation signaling is received from the base station;

In Step 202, all TCI states of the target TCI group indicated by the activation signaling are activated, wherein the target TCI group includes a plurality of TCI states;

In Step 203, a target receiving beam is determined after receiving a configuration signaling from the base station, wherein the target receiving beam is a receiving beam for a reference signal corresponding to a target TCI state, and the target TCI state is a TCI state of the target TCI group indicated by the configuration signaling;

In Step 204, a physical downlink channel scheduled by the configuration signaling is received through the target receiving beam.

In the foregoing embodiment, a terminal may receive an activation signaling from a base station after establishing an RRC connection with the base station, and activate all TCI states of a target TCI group according to the activation signaling. Further, according to the received configuration signaling, a target TCI state is determined in the target TCI group, and a receiving beam for a reference signal corresponding to the target TCI state is taken as a target receiving beam. The terminal may receive a physical downlink channel scheduled by the configuration signaling through the target receiving beam. In the above process, by grouping the TCI states, the base station can use a smaller number of bits in the activation signaling to indicate whether each TCI group is activated, and the terminal may activate all TCI states of the target TCI group according to the activation signaling, thereby reducing overhead of the activation signaling and saving resources of the base station.

For the above Step 201, the terminal may first receive measurement configuration information from the base station according to the related technologies, and report a beam measurement result to the base station according to the measurement configuration information, so that the base station can determine a TCI state set. The beam measurement result may include a RS identifier of a beam and L1-RSRP, etc. The RS identifier may include a RS type and an index number, and the RS type indicates that the reference signal may be SSB or CSI-RS.

After establishing an RRC connection with the base station, the terminal may receive an activation signaling from the base station according to related technologies. In some embodiments of the present disclosure, the activation signaling may be an MAC CE signaling.

For the above Step 202, the terminal activates all TCI states of the target TCI group according to the activation signaling.

In some embodiments of the present disclosure, each TCI group includes a plurality of TCI states, and each TCI group includes the same number of TCI states, for example, each TCI group includes 2, 4, or 8 TCI states. In view of that an MAC CE signaling typically activates 8 TCI states, therefore, in the embodiment of the present disclosure, each TCI group may include up to 8 TCI states.

In addition, different TCI groups may share no common TCI state or share common TCI states. Common TCI states of any two TCI groups should be less than the total number of TCI states of each TCI group.

In a case of transmitting an activation signaling to the terminal, the base station may transmit, to the terminal, an activation signaling which indicates whether all TCI states of each TCI group are activated. The terminal activates all TCI states of a target TCI group according to the activation signaling.

For example, each TCI group includes 4 TCI states, and any two TCI groups have no common TCI state, then the 64 TCI states are divided into 16 groups, and the activation signaling MAC CE needs to transmit 16 bits to the terminal, and a value of the 16 bits sent from the base station to the terminal is 0000 0000 0000 0101 in sequence, indicating the target TCI groups that need to be activated are the first group and the third group from right to left. The terminal determines that the target TCI group is the first group and the third group according to the activation signaling, and the terminal needs to activate all the TCI states of the first group and the third group.

Figure 7:
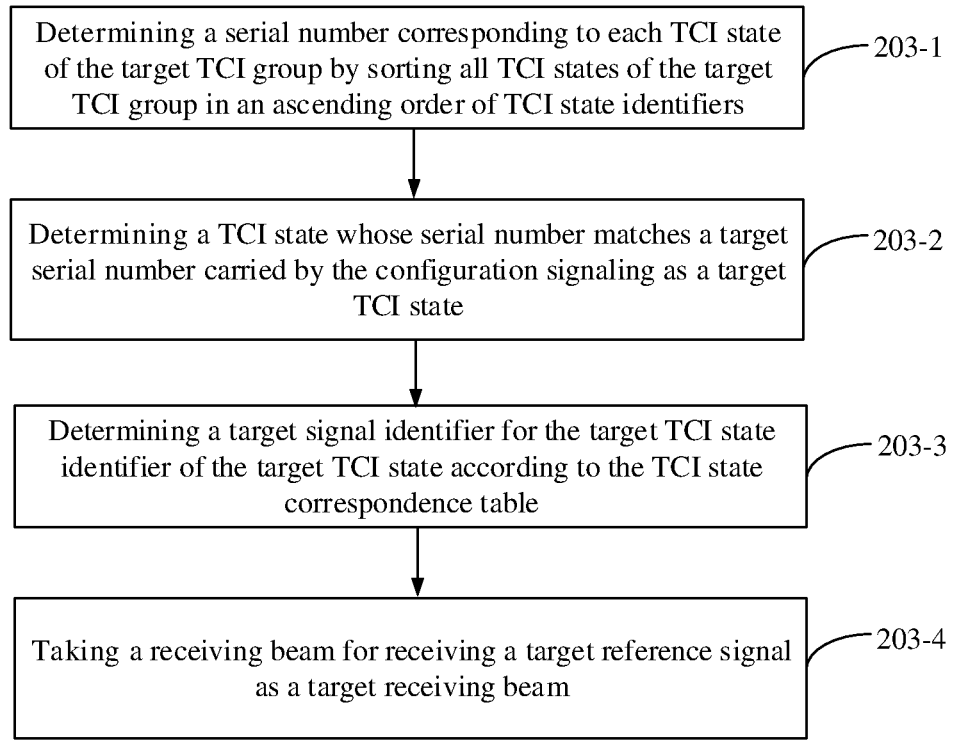
FIG. 7 is a flow chart illustrating a method for configuring transmission configuration indication according to still another exemplary embodiment of the present disclosure.

For the above Step 203, FIG. 7 illustrates a process that the terminal determines a target receiving beam after receiving the configuration signaling from the base station. FIG. 7 illustrates a flow chart of another method for configuring transmission configuration indication according to the embodiment as illustrated in FIG. 6. The Step 203 may include following steps:

In Step 203-1, a serial number corresponding to each TCI state of the target TCI group is determined by sorting all TCI states of the target TCI group in an ascending order of TCI state identifiers;

In this step, after activating all the TCI states of the target TCI group, the terminal may determine a serial number corresponding to each TCI state of the target TCI group by sorting the TCI states in an ascending order of TCI state identifiers, as illustrated in Table 1.

In step 203-2, a TCI state whose serial number matches a target serial number carried by the configuration signaling is determined as a target TCI state.

In this step, in order to compare the serial numbers corresponding to all TCI states of the target TCI group with the target serial number, the terminal may perform a binary conversion on a serial number corresponding to each TCI state in Table 1, so as to obtain a binary value of each TCI state of the target TCI group, as illustrated in Table 4.

TABLE 4

| Target TCI group | TCI state indicator | Serial number | Binary value |
| --- | --- | --- | --- |
| First group | TCI#0 | 0 | 000 |
|  | TCI#1 | 1 | 001 |
|  | TCI#2 | 2 | 010 |
|  | TCI#3 | 3 | 011 |
| The third group | TCI#8 | 4 | 100 |
|  | TCI#9 | 5 | 101 |
|  | TCI#10 | 6 | 110 |
|  | TCI#11 | 7 | 111 |

In the embodiment of the present disclosure, the base station will make the configuration signaling, such as a DCI signaling, carry a target binary value of the target TCI state in a binary manner. In response to determining that the target binary value is 101, the terminal can determine TCI #9 as the target TCI state according to Table 4.

In Step 203-3, according to the TCI state correspondence table, a target signal identifier for the target TCI state identifier of the target TCI state is determined.

In this step, after determining the target TCI state, the terminal may determine the target signal identifier for the target TCI state identifier according to Table 3. It is assumed that the target signal identifier is SSB #4.

In Step 203-4, a receiving beam for receiving a target reference signal is taken as a target receiving beam, and the target reference signal is a reference signal indicated by the target signal identifier.

In this step, the terminal may take the receiving beam for receiving the target reference signal as the target receiving beam, that is, the receiving beam $R_x$ for receiving SSB #4 is taken as the target receiving beam.

In the above embodiment, after activating the target TCI group, the terminal can quickly determine the target TCI state in the activated target TCI group, and finally determine the target receiving beam, thereby reducing overhead of the activation signaling and saving resources of the base station while guaranteeing services of the terminal.

For the above Step 204, after determining the target receiving beam, the terminal may receive a physical downlink channel scheduled by the configuration signaling through the target receiving beam according to related technologies. In some embodiments of the present disclosure, the physical downlink channel may be PDCCH or PDSCH.

Figure 8:
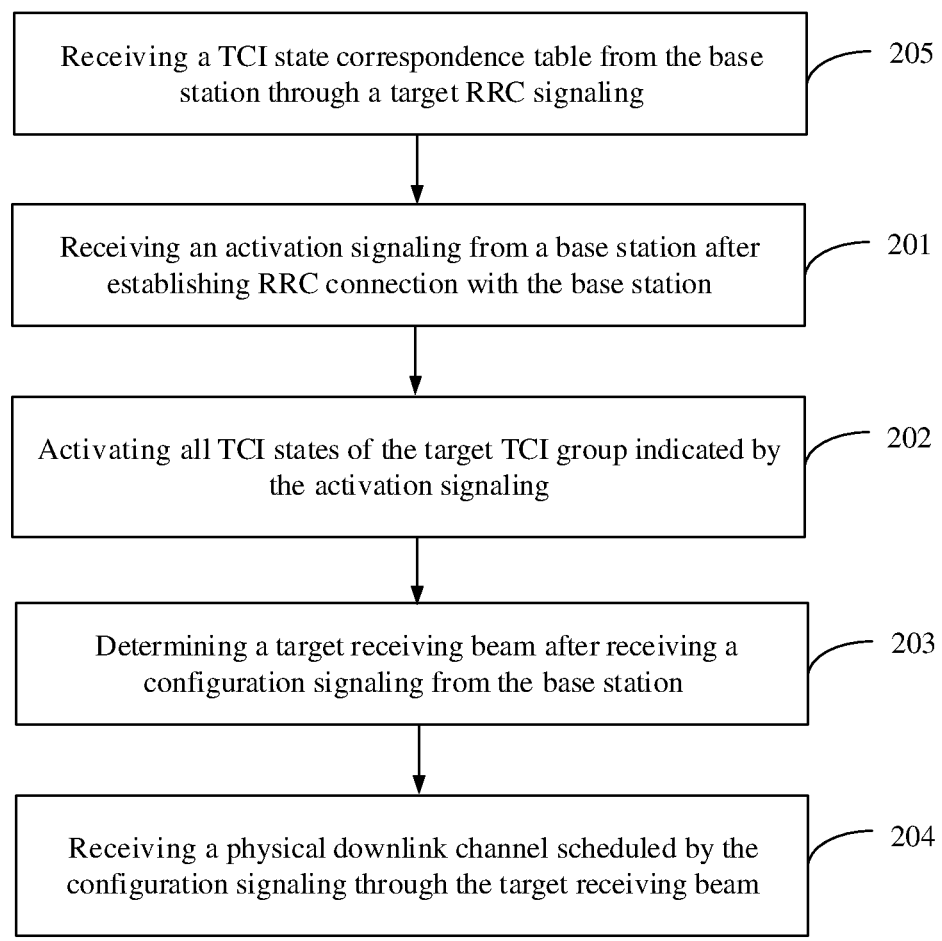
FIG. 8 is a flow chart illustrating a method for configuring transmission configuration indication according to yet another exemplary embodiment of the present disclosure.

In some embodiments of the present disclosure, as illustrated in FIG. 8, which is a flowchart of another method for configuring transmission configuration indication according to the embodiment as illustrated in FIG. 6, before receiving the activation signaling from the base station, the method for configuring transmission configuration indication includes following steps:

In Step 205, a TCI state correspondence table is received from the base station through a target RRC signaling;

wherein the TCI state correspondence table includes a correspondence between a TCI state identifier and a signal identifier, the TCI state identifier comprises a state identifier of each TCI state, and the signal identifier comprises an identifier of a reference signal for a current TCI state.

In this step, the base station may transmit the Table 2 to the terminal through a target RRC signaling before transmitting an activation signaling to the terminal, and the terminal receives the Table 2 according to related technologies, so that the terminal can subsequently determine a target receiving beam for receiving a physical downlink channel scheduled by the configuration signaling according to the TCI state correspondence table, with high availability.

In the embodiment, the terminal may further receive, from the base station and through the target RRC signaling, grouping indication information which indicates a TCI group corresponding to each TCI state identifier in the TCI state correspondence table.

In other words, the base station transmits the Table 3 to the terminal through the target RRC signaling, and the terminal determines the TCI states of each TCI group in the TCI state correspondence table according to the grouping indication information, and subsequently, the base station may use a relatively small number of bits in the activation signaling to indicate whether each TCI group is activated. Once the target TCI group is activated, all TCI states of the target TCI group are activated, thereby reducing overhead of the activation signaling.

In some embodiments of the present disclosure, optionally, the grouping indication information only needs to provide the number L of TCI states grouped into a group and the number M of common TCI states of every two adjacent TCI groups. For example, in a case of L=4 and M=0, a predefined grouping indication information indicates that consecutive L TCI states are grouped into one group, that is, TCI #0, TCI #1, TCI #2, and TCI #3 belong to a first group, and TCI #4, TCI #5, TCI #6, TCI #7 belong to a second group, and so on. Or, the base station does not need to transmit any grouping indication information to the terminal, that is, the values of L and M are also predefined, and the above grouping indication information is written directly into a chip of the base station and a chip of the terminal. Accordingly, the base station does not need to transmit grouping indication information to the terminal any more, and the terminal may directly acquire grouping indication information from its own chip, thereby saving signaling resources for interaction between the base station and the terminal.

Figure 9:
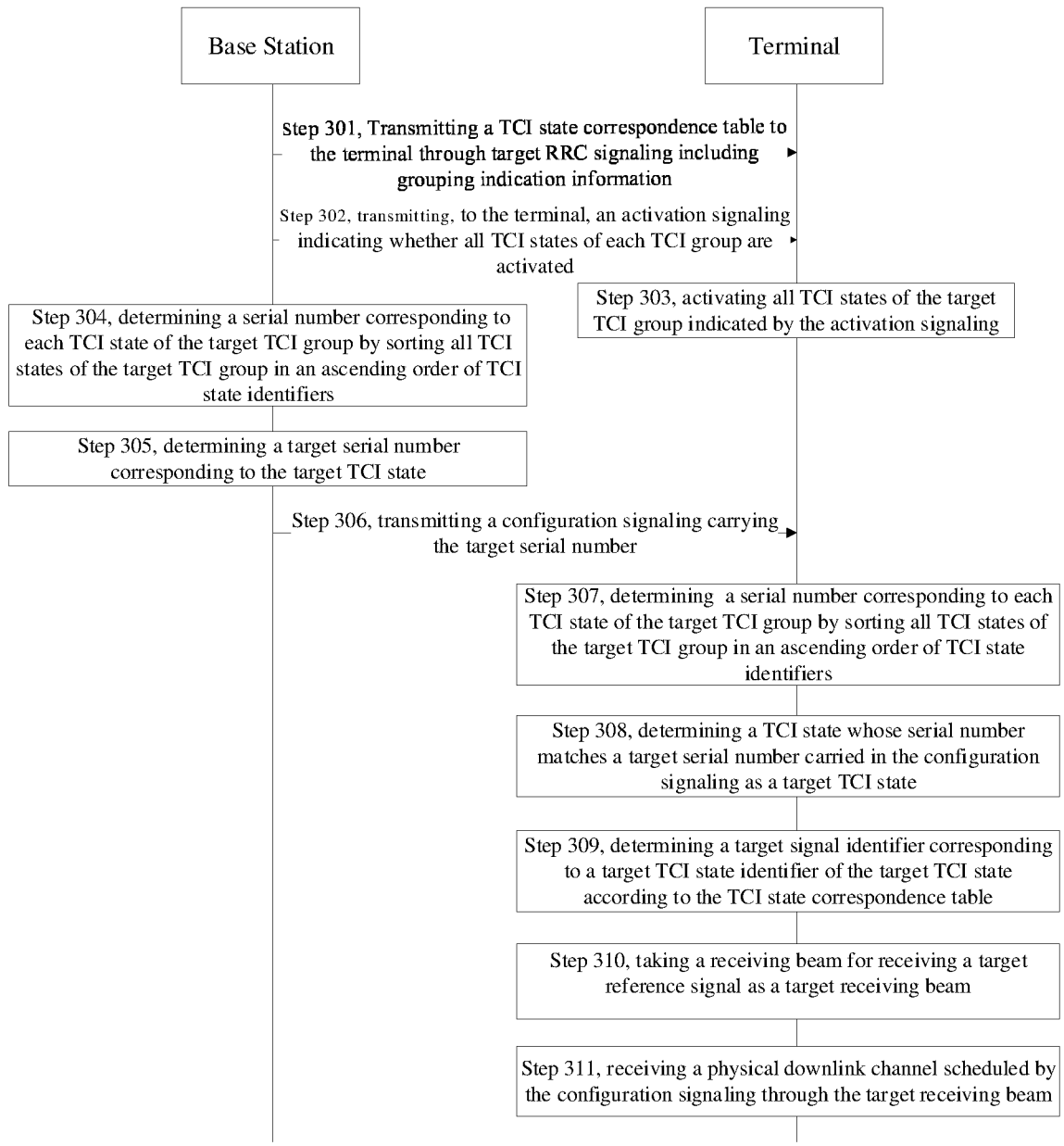
FIG. 9 is a flow chart illustrating a method for configuring transmission configuration indication according to still another exemplary embodiment of the present disclosure.

The embodiment of the present disclosure provides another method for configuring transmission configuration indication. Referring to FIG. 9, which illustrates a flowchart of another method for configuring transmission configuration indication according to an exemplary embodiment of the present disclosure, the method includes following steps:

In step 301, the base station transmits a TCI state correspondence table to the terminal through a target RRC signaling, and the target RRC signaling further includes grouping indication information.

wherein, the TCI state correspondence table includes a correspondence between a TCI state identifier and a signal identifier, the TCI state identifier comprises a state identifier of each TCI state, and the signal identifier comprises an identifier of a reference signal for a current TCI state; and the grouping indication information indicates a TCI group corresponding to each TCI state identifier in the TCI state correspondence table.

In Step 302, the base station transmits, to the terminal, an activation signaling which indicates whether all TCI states of each TCI group are activated.

In some embodiments of the present disclosure, the activation signaling may be an MAC CE signaling. In such a case, the base station needs N bits to indicate which target TCI group is activated, and N is much smaller than 64.

In Step 303, the terminal activates all TCI states of the target TCI group indicated by the activation signaling.

wherein the target TCI group includes a plurality of TCI states.

In Step 304, the base station determine a serial number corresponding to each TCI state of the target TCI group by sorting all TCI states of the target TCI group in an ascending order of TCI state identifiers.

In Step 305, the base station determines a target serial number corresponding to the target TCI state;

wherein the target TCI state is a TCI state of the target TCI group that needs to be indicated by a configuration signaling subsequently.

In Step 306, the base station transmits, to the terminal, a configuration signaling carrying the target serial number.

The configuration signaling is to instruct the terminal to receive, through a target receiving beam, a physical downlink channel scheduled by the configuration signaling, wherein the target receiving beam is a receiving beam for a reference signal RS corresponding to the target TCI state.

In Step 307, the terminal determines a serial number corresponding to each TCI state of the target TCI group by sorting all TCI states of the target TCI group in an ascending order of TCI state identifiers.

In Step 308, the terminal determines a TCI state whose serial number matches a target serial number carried in the configuration signaling as a target TCI state.

In Step 309, the terminal determines a target signal identifier corresponding to a target TCI state identifier of the target TCI state according to the TCI state correspondence table.

In Step 310, the terminal takes a receiving beam for receiving a target reference signal as a target receiving beam;

wherein the target reference signal is a reference signal indicated by the target signal identifier.

In Step 311, the terminal receives a physical downlink channel scheduled by the configuration signaling through the target receiving beam.

In the above embodiment, the base station may first transmit the target RRC signaling to the terminal, such that both the TCI state correspondence table and the TCI group information are transmitted to the terminal through the target RRC signaling. Furthermore, the base station transmits the activation signaling to the terminal to activate all the TCI states of the target TCI group, and then, the base station transmits the configuration signaling to the terminal to indicate that the receiving beam for the reference signal corresponding to the target TCI state is taken as the target receiving beam, such that the terminal receive the physical downlink channel scheduled by the configuration signaling through the target receiving beam. In the above process, by grouping the TCI states, a smaller number of bits in the activation signaling may be used to indicate whether each TCI group is activated. Once the target TCI group is activated, all TCI states of the target TCI group are activated, which reduces overhead of the activation signaling and saves resources of the base station.

Corresponding to the method embodiments for implementing the application functions, embodiments of the present disclosure further provides devices of configuring transmission configuration indication and corresponding base stations and terminals.

Figure 10:
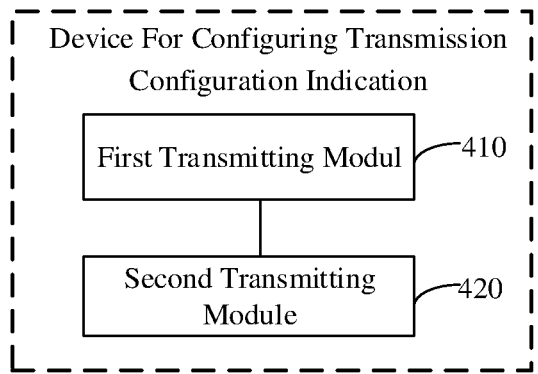
FIG. 10 is a block diagram illustrating a device for configuring transmission configuration indication according to an exemplary embodiment of the present disclosure.

Referring to FIG. 10, which is a block diagram illustrating a device for configuring transmission configuration indication, the device is applicable to a base station and includes:

a first transmitting module 410, configured to transmit, and after establishing a radio resource control (RRC) connection with a terminal, an activation signaling to the terminal, wherein the activation signaling is to activate all TCI states of a target TCI group, and the target TCI group includes a plurality of TCI states; and a second transmitting module 420, configured to transmit a configuration signaling to the terminal, wherein the configuration signaling is to instruct the terminal to receive a physical downlink channel scheduled by the configuration signaling through a target receiving beam, the target receiving beam is a receiving beam for a reference signal corresponding to a target TCI state, and the target TCI state is a TCI state of the target TCI group indicated by the configuration signaling.

In the above-mentioned embodiment, a base station may transmit an activation signaling to a terminal after establishing an RRC connection with the terminal, thereby activating all TCI states of the target TCI group. Furthermore, the base station transmits a configuration signaling to the terminal to indicate a receiving beam for a reference signal corresponding to a target TCI state in the activated TCI group as a target receiving beam, such that the terminal may receive a physical downlink channel scheduled by the configuration signaling through the target receiving beam. In the above process, by grouping the TCI states, a smaller number of bits in the activation signaling can be used to indicate whether each TCI group is activated. Once the target TCI group is activated, all TCI states of the target TCI group are activated, which reduces overhead of the activation signaling and saves resources of the base station.

Figure 11:
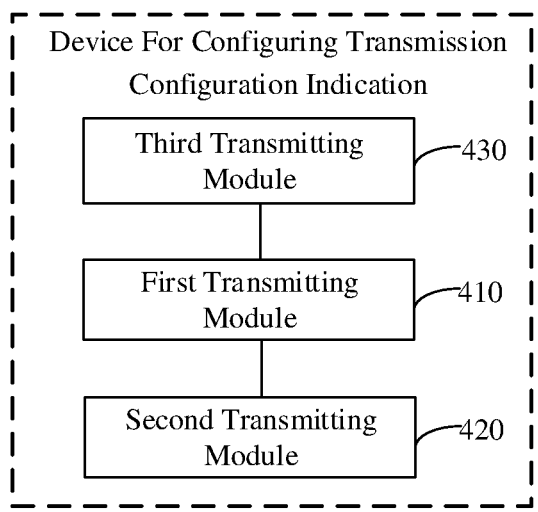
FIG. 11 is a block diagram illustrating a device for configuring transmission configuration indication according to another exemplary embodiment of the present disclosure.

Referring to FIG. 11, which illustrates a block diagram of another device for configuring transmission configuration indication on the basis of the embodiment as illustrated in FIG. 10, the device further includes:

a third transmitting module 430, configured to transmit, through a target RRC signaling, a TCI state correspondence table to the terminal, wherein the TCI state correspondence table includes a correspondence between a TCI state identifier and a signal identifier, the TCI state identifier comprises a state identifier of each TCI state, and the signal identifier comprises an identifier of a reference signal for a current TCI state.

In the foregoing embodiment, the base station may transmit a TCI state correspondence table to the terminal through the target RRC signaling before transmitting the activation signaling to the terminal, wherein the TCI state correspondence table includes a correspondence between a TCI state identifier and a signal identifier, the TCI state identifier comprises a state identifier of each TCI state, and the signal identifier comprises an identifier of a reference signal for a current TCI state. In the embodiment of the present disclosure, the base station transmits the TCI state correspondence table to the terminal, so that the terminal can subsequently determine a target receiving beam for receiving a physical downlink channel scheduled by the configuration signaling according to the TCI state correspondence table, with high availability.

In some embodiments of the present disclosure, the target RRC signaling further includes grouping indication information, which is used to indicate a TCI state corresponding to each TCI state identifier in the TCI state correspondence table.

In the above embodiment, the base station may further transmit the grouping indication information to the terminal through the target RRC signaling, so that the terminal can determine the TCI state of each TCI group in the TCI state correspondence table according to the grouping indication information. And subsequently, the base station may use a smaller number of bits in an activation signaling to indicate whether each TCI group is activated, and in response to that a target TCI group is activated, all TCI states of the target TCI group are activated, thereby reducing overhead of the activation signaling.

Figure 12:
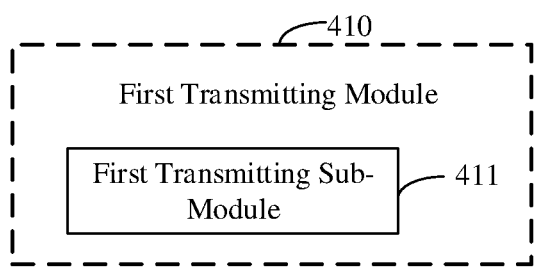
FIG. 12 is a block diagram illustrating a device for configuring transmission configuration indication according to still another exemplary embodiment of the present disclosure.

Referring to FIG. 12, which is a block diagram illustrating another device for configuring transmission configuration instructions based on the embodiment as illustrated in FIG. 10, the first transmitting module 410 includes:

a first transmitting sub-module 411, configured to transmit an activation signaling to the terminal, wherein the activation signaling indicates whether all TCI states of each TCI group are activated.

In the above embodiment, in a case that the base station transmits the activation signaling, the activation signaling can indicate whether all TCI states of each TCI group are activated, so that the terminal can determine, after receiving the activation signaling, that all TCI states of the target TCI group are activated, which reduces overhead of the activation signaling and saves resources of the base station.

Figure 13:
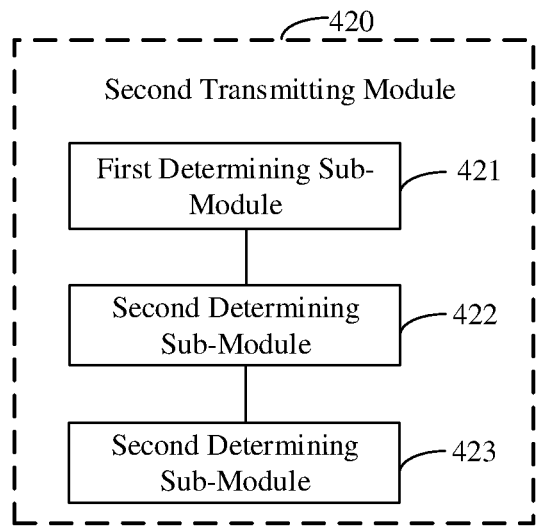
FIG. 13 is a block diagram illustrating a device for configuring transmission configuration indication according to yet another exemplary embodiment of the present disclosure.

Referring to FIG. 13, which is a block diagram illustrating another configuration device for configuring transmission configuration indication based on the embodiment as illustrated in FIG. 10, the second transmitting module 420 includes:

a first determining sub-module 421, configured to determine a serial number of each TCI state of the target TCI group by sorting all TCI states of the target TCI group in an ascending order of TCI state identifiers;

a second determining sub-module 422, configured to determine a target serial number of the target TCI state; and a second transmitting sub-module 423, configured to transmit the configuration signaling carrying the target serial number to the terminal.

In the foregoing embodiment, the base station may determine a serial number of each TCI state of the target TCI group by sorting all TCI states of the target TCI group in an ascending order of TCI state identifiers. The base station may transmit the target serial number to the terminal through the configuration signaling. At the terminal side, a corresponding target TCI state may be determined according to the target serial number, such that a target receiving beam may be determined. Through the above process, after activating the target TCI group, the base station may enable the terminal to quickly determine the target TCI state in the activated target TCI group through the configuration signaling, thus, it also saves the overhead of the activation signaling while guarantee services of the terminal.

Figure 14:
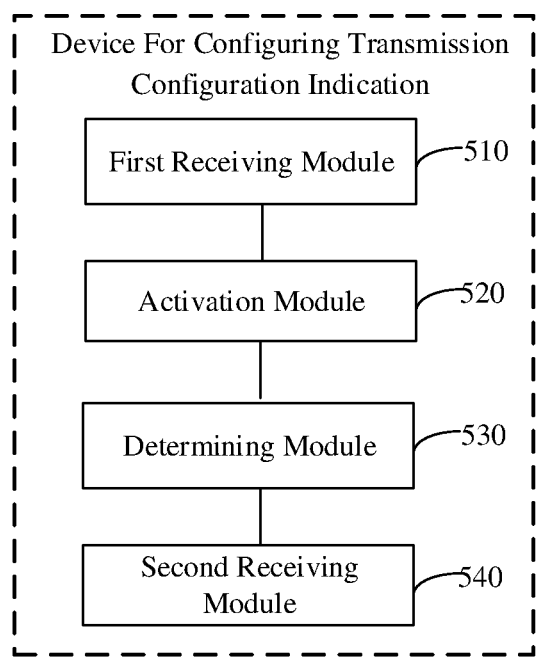
FIG. 14 is a block diagram illustrating a device for configuring transmission configuration indication according to still another exemplary embodiment of the present disclosure.

Referring to FIG. 14, which illustrates a block diagram of a device for configuring transmission configuration indication according to an exemplary embodiment, the device is applicable to a terminal and includes:

- a first receiving module 510, configured to receive, after establishing a radio resource control (RRC) connection with a base station, an activation signaling from the base station;
- an activation module 520, configured to activate all TCI states of a target TCI group indicated by the activation signaling, wherein the target TCI group includes a plurality of TCI states;
- a determining module 530, configured to determine a target receiving beam after receiving a configuration signaling from the base station, wherein the target receiving beam is a receiving beam for a reference signal corresponding to a target TCI state, and the target TCI state is a TCI state of the target TCI group indicated by the configuration signaling; and
- a second receiving module 540, configured to receive a physical downlink channel scheduled by the configuration signaling through the target receiving beam.

In the foregoing embodiment, the terminal may receive an activation signaling from a base station after establishing an RRC connection with the base station, and activate all TCI states of the target TCI group according to the activation signaling. Further, according to a received configuration signaling, a target TCI state is determined in the target TCI group, and a receiving beam for a reference signal corresponding to the target TCI state is taken as a target receiving beam. The terminal may receive a physical downlink channel scheduled by the configuration signaling through the target receiving beam. In the above process, by grouping the TCI states, the base station can use a smaller number of bits in the activation signaling to indicate whether each TCI group is activated, and the terminal can activate all TCI states of the target TCI group indicated by the activation signaling, thereby reducing overhead of the activation signaling and saving resources of the base station.

Figure 15:
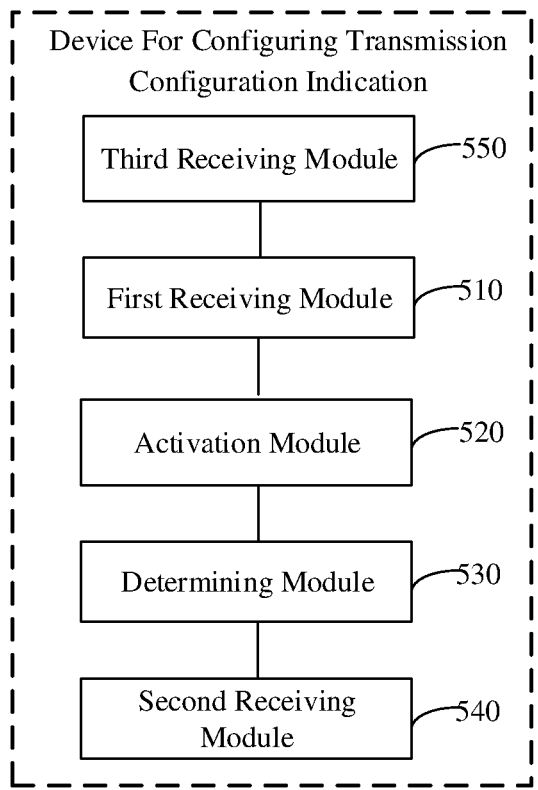
FIG. 15 is a block diagram illustrating a device for configuring transmission configuration indication according to yet another exemplary embodiment of the present disclosure.

Referring to FIG. 15, FIG. 15 is a block diagram illustrating another device for configuring transmission configuration indication based on the embodiment as illustrated in FIG. 14, and the device further includes:

- a third receiving module 550, configured to receive, through a target RRC signaling, a TCI state correspondence table from the base station, wherein the TCI state correspondence table includes a correspondence between a TCI state identifier and a signal identifier, the TCI state identifier comprises a state identifier of each TCI state, and the signal identifier comprises an identifier of a reference signal for a current TCI state.

In the foregoing embodiment, a terminal may receive, through a target RRC signaling, a TCI state correspondence table from a base station before receiving an activation signaling from the base station. The TCI state correspondence table includes a correspondence between TCI state identifiers and signal identifiers, the TCI state identifiers comprises a state identifier of each TCI state, and the signal identifiers comprises an identifier of a reference signal for a current TCI state. It is convenient for the terminal to subsequently determine a target receiving beam for receiving a physical downlink channel scheduled by the configuration signaling according to the TCI state correspondence table, and the availability is high.

In some embodiments of the present disclosure, the target RRC signaling further includes grouping indication information, which is used to indicate a TCI group corresponding to each TCI state identifier in the TCI state correspondence table.

In the above embodiment, the terminal may further receive a target RRC signaling including grouping indication information, so that the terminal can determine TCI states of each TCI group in the TCI state correspondence table according to the grouping indication information, and subsequently the base station may use a relatively small number of bits in the activation signaling to indicate whether each TCI group is activated, and in response to determining that the target TCI group is activated, all TCI states of the target TCI group are activated, thereby reducing overhead of the activation signaling.

Figure 16:
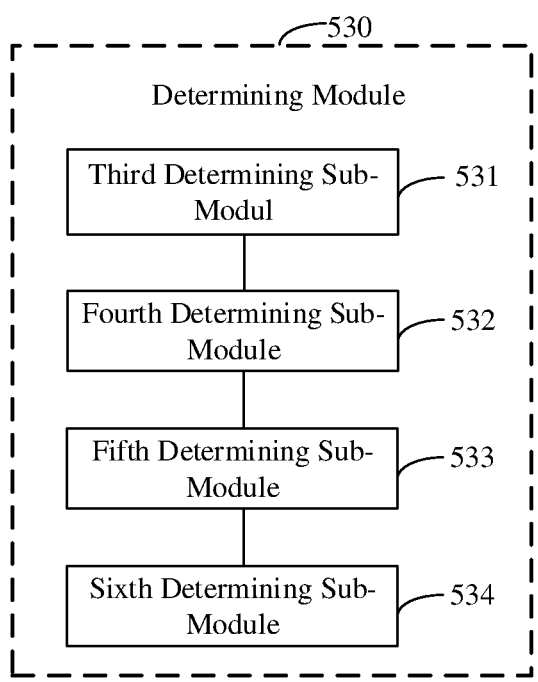
FIG. 16 is a block diagram illustrating a device for configuring transmission configuration indication according to yet another exemplary embodiment of the present disclosure.

Referring to FIG. 16, FIG. 16 is a block diagram illustrating another device for configuring transmission configuration indication based on the embodiment as illustrated in FIG. 14. The determining module 530 includes:

- a third determining sub-module 531, configured to determine a serial number for each TCI state of the target TCI group by sorting all TCI states of the target TCI group in an ascending order of TCI state identifiers;
- a fourth determining sub-module 532, configured to determine a TCI state whose serial number matches a target serial number carried by the configuration signaling as a target TCI state;
- a fifth determining sub-module 533, configured to determine a target signal identifier corresponding to a target TCI state identifier of the target TCI state according to the TCI state correspondence table; and
- a sixth determining sub-module 534, configured to take a receiving beam for receiving a target reference signal as a target receiving beam, wherein the target reference signal is a reference signal indicated by the target signal identifier.

In the foregoing embodiment, the terminal may determine a serial number corresponding to each TCI state of the target TCI group by sorting all the TCI states of the activated target TCI group in an ascending order of TCI state identifiers. The target TCI state is a TCI state whose serial number matches the target serial number carried by the configuration signaling. According to the previously received TCI state correspondence table, the target TCI state in the target TCI group, as well as its corresponding target signal identifier, can be quickly determined. A reference signal indicated by the target signal identifier is the target reference signal, and the terminal takes a receiving beam for receiving the target reference signal as a target receiving beam. Through the above process, the terminal can quickly determine the target TCI state of the activated target TCI group after activating the target TCI group, and finally determine the target receiving beam, thereby saving overhead of the activation signaling as well as resources of the base station while guaranteeing services of the terminal.

As for the device embodiment, it basically corresponds to the method embodiment, and the relevant part can be referred to the part of the description of the method embodiment. The device embodiments described above are merely illustrative. The units described above as separate components may or may not be physically separated, and the components displayed as units may or may not be physical units, that is, they may be located at one place, or they may be distributed to a plurality of network units. Some or all of the modules can be selected according to actual requirement to achieve the objectives of the solutions of the present disclosure. One of ordinary skill in the art can understand and implement it without creative work.

Correspondingly, the present disclosure further provides a computer-readable storage medium, the storage medium stores a computer program, and in a case of executing the computer program, operations of any one of the methods for configuring transmission configuration indication applicable to a base station are implemented.

Correspondingly, the present disclosure further provides a computer-readable storage medium, the storage medium stores a computer program, and in a case of executing the computer program, operations of any one of the methods for configuring transmission configuration indication applicable to a terminal are implemented.

Correspondingly, the present disclosure further provides an apparatus for configuring transmission configuration indication. The apparatus is applicable to a base station and includes:

a processor;

a memory configured to store instructions executable by the processor;

wherein, the processor is configured to:

transmit, after establishing a radio resource control (RRC) connection with a terminal, an activation signaling to the terminal, wherein the activation signaling is to activate all TCI states of a target TCI group, and the target TCI group includes a plurality of TCI state; and transmit a configuration signaling to the terminal, wherein the configuration signaling to instruct the terminal to receive a physical downlink channel scheduled by the configuration signaling through a target receiving beam, the target receiving beam is a receiving beam for a reference signal corresponding to a target TCI state, and the target TCI state is a TCI state of the TCI group indicated by the configuration signaling.

Figure 17:
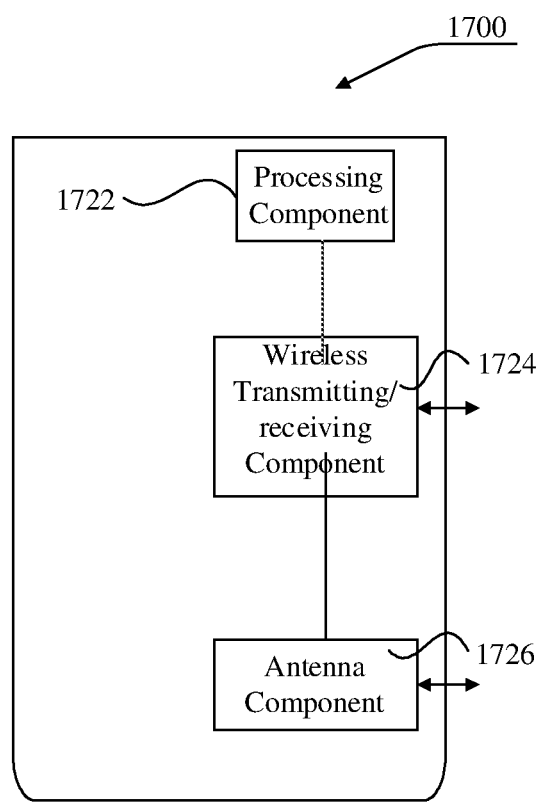
FIG. 17 is a schematic structural diagram illustrating an apparatus for configuring transmission configuration indication according to an exemplary embodiment of the present disclosure.

As illustrated in FIG. 17, which is a schematic structural diagram illustrating an apparatus 1700 for configuring transmission indication according to an exemplary embodiment. The apparatus 1700 may be provided as a base station. Referring to FIG. 17, the apparatus 1700 includes a processing component 1722, a wireless transmitting/receiving component 1724, an antenna component 1726, and a signal processing part specific to a wireless interface. The processing component 1722 may further include one or more processors.

A processor of the processing component 1722 may be configured to implement operations of any of the methods for configuring transmission configuration indication which is applicable to a base station.

Correspondingly, the present disclosure further provides an apparatus for configuring transmission configuration indication. The apparatus is applicable to a terminal and includes:

a processor;

a memory configured to store instructions executable by the processor;

wherein, the processor is configured to:

receive, after establishing a radio resource control (RRC) connection with a base station, an activation signaling from the base station;

activate all TCI states of a target TCI group indicated by the activation signaling, wherein the target TCI group includes a plurality of TCI states;

determine a target receiving beam after receiving a configuration signaling from the base station, wherein the target receiving beam is a receiving beam for a reference signal corresponding to a target TCI state, and the target TCI state is a TCI state of the TCI group indicated by the configuration signaling; and receive a physical downlink channel scheduled by the configuration signaling through the target receiving beam.

Figure 18:
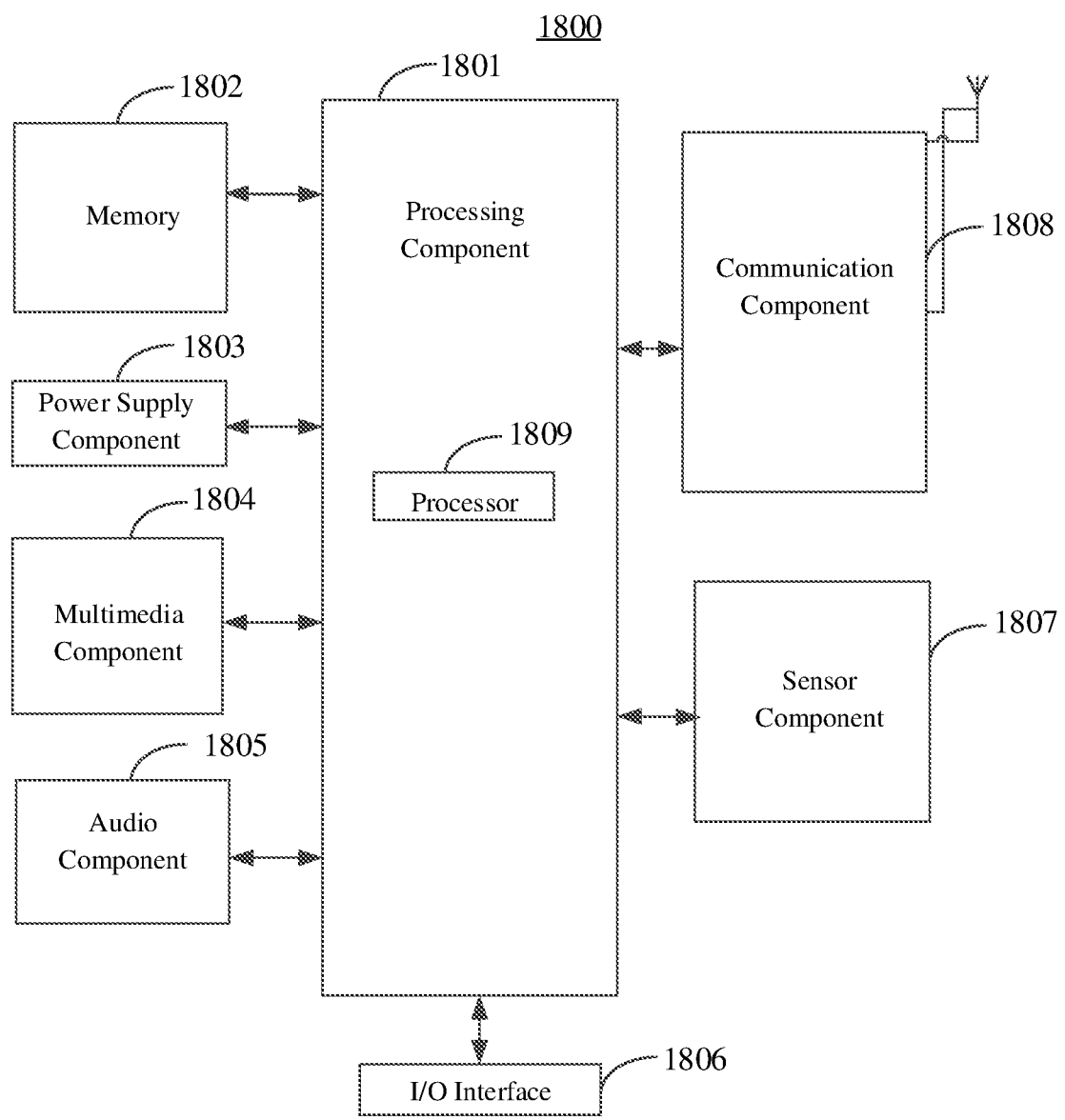
FIG. 18 is a schematic structural diagram illustrating an apparatus for configuring transmission configuration indication according to another exemplary embodiment of the present disclosure.

FIG. 18 is a schematic structural diagram illustrating an apparatus for configuring transmission configuration indication according to an exemplary embodiment. Referring to FIG. 18, an apparatus for configuring transmission configuration indication is illustrated according to an exemplary embodiment. The apparatus 1800 may be a computer, a mobile phone, a digital broadcasting terminal, a messaging device, a game console, a tablet device, or a medical device, fitness equipment, a personal digital assistant and other terminals.

Referring to FIG. 18, the apparatus 1800 may include one or more of the following components: a processing component 1801, a memory 1802, a power supply component 1803, a multimedia component 1804, an audio component 1805, an input/output (I/O) interface 1806, a sensor component 1807, and a communication component 1808.

The processing component 1801 generally controls overall operations of the apparatus 1800, such as operations associated with display, telephone calls, data communications, camera operations, and recording operations. The processing component 1801 may include one or more processors 1809 to execute instructions to complete all or part of the steps of the foregoing method. In addition, the processing component 1801 may include one or more modules to facilitate interaction between the processing component 1801 and other components. For example, the processing component 1801 may include a multimedia module to facilitate interaction between the multimedia component 1804 and the processing component 1801.

The memory 1802 is configured to store various types of data to support operations of the apparatus 1800. Examples of such data include instructions for any application or method operating on the apparatus 1800, contact data, phone book data, messages, pictures, videos, etc. The memory 1802 can be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, a magnetic disk or an optical disk.

The power supply component 1803 is configured to supply power to various components of the apparatus 1800. The power supply component 1803 may include a power management system, one or more power supplies, and other components associated with generating, managing, and distributing power for the apparatus 1800.

The multimedia component 1804 includes a screen that provides an output interface between the apparatus 1800 and the user. In some embodiments of the present disclosure, the screen may include a liquid crystal display (LCD) and a touch panel (TP). In a case that the screen includes a touch panel, the screen may be implemented as a touch screen to receive an input signal from the user. The touch panel includes one or more touch sensors to sense touch, slide, and gestures on the touch panel. The touch sensor may not only sense a boundary of the touch or the slide operation, but also detect duration and pressure related to the touch or the slide operation. In some embodiments of the present disclosure, the multimedia component 1804 includes a front camera and/or a rear camera. When the apparatus 1800 is in an operation mode, such as an image shooting mode or a video recording mode, the front camera and/or the rear camera may receive external multimedia data. Each of the front camera and the rear camera may be a fixed optical lens system or a lens system with a focal length and optical zooming capabilities.

The audio component 1805 is configured to output and/or input audio signals. For example, the audio component 1805 includes a microphone (MIC), and in a case that the apparatus 1800 is in an operation mode, such as a calling mode, a recording mode, and a voice recognition mode, the microphone is configured to receive external audio signals. The received audio signal may be further stored in the memory 1802 or be transmitted via the communication component 1808. In some embodiments, the audio component 1805 further includes a speaker for outputting audio signals.

The I/O interface 1806 provides an interface between the processing component 1801 and a peripheral interface module. The peripheral interface module may be a keyboard, a click wheel, a button, and the like. These buttons may include but are not limited to: a home button, a volume button, a start button, and a lock button.

The sensor component 1807 includes one or more sensors for providing the apparatus 1800 with various aspects of status assessment. For example, the sensor component 1807 may detect the ON/OFF state of the apparatus 1800 as well as relative positioning of components, for example, the components are the display and the keypad of the apparatus 1800. The sensor component 1807 may further detect position change of the apparatus 1800 or of a component of the apparatus 1800, presence or absence of contact between the user and the apparatus 1800, orientation or acceleration/deceleration of the apparatus 1800, and temperature change of the apparatus 1800. The sensor component 1807 may include a proximity sensor configured to detect presence of nearby objects in a case that there is no physical contact. The sensor component 1807 may further include a light sensor, such as a CMOS or CCD image sensor, for use in imaging applications. In some embodiments of the present disclosure, the sensor component 1807 may further include an acceleration sensor, a gyroscope sensor, a magnetic sensor, a pressure sensor or a temperature sensor.

The communication component 1808 is configured to facilitate wired or wireless communication between the apparatus 1800 and other apparatus. The apparatus 1800 can access a wireless network based on a communication standard, such as WiFi, 2G, or 3G, or a combination thereof. In an exemplary embodiment of the present disclosure, the communication component 1808 receives a broadcast signal or broadcast related information from an external broadcast management system via a broadcast channel In an exemplary embodiment of the present disclosure, the communication component 1808 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment of the present disclosure, the apparatus 1800 may be implemented by one or more application specific integrated circuits (ASIC), digital signal processors (DSP), digital signal processing equipment (DSPD), programmable logic devices (PLD), field programmable gate arrays (FPGA), controllers, microcontrollers, microprocessors, or other electronic components, so as to perform the above methods.

In an exemplary embodiment of the present disclosure, there is further provided a non-transitory computer-readable storage medium including instructions, such as a memory 1802 including instructions, which may be executed by the processor 1809 of the apparatus 1800 to complete the foregoing method. For example, the non-transitory computer-readable storage medium may be ROM, random access memory (RAM), a CD-ROM, a magnetic tape, a floppy disk, an optical data storage device, and etc.

In a case that the instructions in the storage medium are executed by the processor, the apparatus 1800 may perform operations of any of the foregoing methods for configuring transmission configuration indication that is applicable to a terminal side.

One of ordinary skill in the art will easily conceive of other embodiments of the present disclosure after considering the description and practicing the present disclosure disclosed herein. The present disclosure is intended to cover any variations, uses, or adaptive changes of the present disclosure, and these variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are defined by the appended claims.

It should be understood that the present disclosure is not limited to the exact structures that has been described above and illustrated in the drawings, and various modifications and changes can be made without departing from its scope. The scope of the present disclosure is only defined by the appended claims.

The invention claimed is:

1. A method for configuring transmission configuration indication (TCI), wherein the method is performed by a base station and comprises:
    transmitting, after establishing a radio resource control (RRC) connection with a terminal, an activation signaling to the terminal, wherein the activation signaling is to activate all TCI states of a target TCI group, and the target TCI group comprises a plurality of TCI states; and
    transmitting a configuration signaling to the terminal, wherein the configuration signaling is to instruct the terminal to receive a physical downlink channel scheduled by the configuration signaling through a target receiving beam, the physical downlink channel is a physical downlink control channel (PDCCH) and the configuration signaling is a downlink control information (DCI) signaling, the target receiving beam is a receiving beam for a reference signal corresponding to a target TCI state, and the target TCI state is a TCI state of the target TCI group indicated by the configuration signaling.

2. The method according to claim 1, wherein before transmitting the activation signaling to the terminal, the method further comprises:
    transmitting, through a target RRC signaling, a TCI state correspondence table to the terminal, wherein the TCI state correspondence table comprises a correspondence between a TCI state identifier and a signal identifier, the TCI state identifier comprises a state identifier of each TCI state, and the signal identifier comprises an identifier of a reference signal for a current TCI state.

3. The method according to claim 2, wherein the target RRC signaling further comprises grouping indication information, the grouping indication information indicating a TCI group corresponding to each TCI state identifier in the TCI state correspondence table.

4. The method according to claim 1, wherein transmitting the activation signaling to the terminal comprises:
   transmitting, to the terminal, the activation signaling which indicates whether all TCI states of each TCI group are activated.

5. The method according to claim 1, wherein transmitting the configuration signaling to the terminal comprises:
   determining a serial number corresponding to each TCI state of the target TCI group by sorting all TCI states of the target TCI group in an ascending order of TCI state identifiers;
   determining a target serial number corresponding to the target TCI state; and
   transmitting, to the terminal, the configuration signaling carrying the target serial number.

6. A non-transitory computer-readable storage medium having stored therein instructions that, when executed by a processor of a base station, cause the base station to perform the method according to claim 1.

7. A method for configuring a transmission configuration indication (TCI), wherein the method is performed by a terminal, and comprises:
   receiving, after establishing a radio resource control (RRC) connection with a base station, an activation signaling from the base station;
   activating all TCI states of a target TCI group indicated by the activation signaling, wherein the target TCI group comprises a plurality of TCI states;
   determining a target receiving beam after receiving a configuration signaling from the base station, wherein the target receiving beam is a receiving beam for a reference signal corresponding to a target TCI state, and the target TCI state is a TCI state of the target TCI group indicated by the configuration signaling; and
   receiving, through the target receiving beam, a physical downlink channel scheduled by the configuration signaling, wherein the physical downlink channel is a physical downlink control channel (PDCCH) and the configuration signaling is a downlink control information (DCI) signaling.

8. The method according to claim 7, wherein, before receiving the activation signaling from the base station, the method further comprises:
   receiving, through a target RRC signaling, a TCI state correspondence table from the base station, wherein the TCI state correspondence table includes a correspondence between a TCI state identifier and a signal identifier, the TCI state identifier comprises a state identifier of each TCI state, and the signal identifier comprises an identifier of a reference signal for a current TCI state.

9. The method according to claim 8, wherein the target RRC signaling further comprises grouping indication information, the grouping indication information indicating a TCI group corresponding to each TCI state identifier in the TCI state correspondence table.

10. The method according to claim 8, wherein determining the target receiving beam after receiving the configuration signaling from the base station comprises:
    determining a serial number of each TCI state of the target TCI group by sorting all TCI states of the target TCI group in an ascending order of TCI state identifiers;
    determining a TCI state whose serial number matches a target serial number carried by the configuration signaling as a target TCI state;
    determining a target signal identifier corresponding to a target TCI state identifier of the target TCI state from the TCI state correspondence table; and
    taking a receiving beam for receiving a target reference signal as a target receiving beam, wherein the target reference signal is a reference signal indicated by the target signal identifier.

11. A non-transitory computer-readable storage medium having stored therein instructions that, when executed by a processor of a terminal, cause the terminal to perform the method according to claim 7.

12. A terminal, comprising:
    a processor; and
    a memory configured to store instructions executable by the processor;
    wherein the processor is configured to perform the method according to claim 7.

13. The terminal according to claim 12, wherein, before receiving the activation signaling from the base station, the processor is further configured to:
    receive, through a target RRC signaling, a TCI state correspondence table from the base station, wherein the TCI state correspondence table includes a correspondence between a TCI state identifier and a signal identifier, the TCI state identifier comprises a state identifier of each TCI state, and the signal identifier comprises an identifier of a reference signal for a current TCI state.

14. The terminal according to claim 13, wherein the target RRC signaling further comprises grouping indication information, the grouping indication information indicating a TCI group corresponding to each TCI state identifier in the TCI state correspondence table.

15. The terminal according to claim 13, wherein in determining the target receiving beam after receiving the configuration signaling from the base station, the processor is further configured to:
    determine a serial number of each TCI state of the target TCI group by sorting all TCI states of the target TCI group in an ascending order of TCI state identifiers;
    determine a TCI state whose serial number matches a target serial number carried by the configuration signaling as a target TCI state;
    determine a target signal identifier corresponding to a target TCI state identifier of the target TCI state from the TCI state correspondence table; and
    take a receiving beam for receiving a target reference signal as a target receiving beam, wherein the target reference signal is a reference signal indicated by the target signal identifier.

16. A base station, comprising:
    a processor; and
    a memory configured to store instructions executable by the processor;
    wherein the processor is configured to:
    transmit, after establishing a radio resource control (RRC) connection with a terminal, an activation signaling to the terminal, wherein the activation signaling is to activate all transmission configuration indication (TCI) states of a target TCI group, and the target TCI group comprises a plurality of TCI states; and
    transmit a configuration signaling to the terminal, wherein the configuration signaling is to instruct the terminal to receive a physical downlink channel scheduled by the configuration signaling through a target receiving beam, the physical downlink channel is a physical downlink control channel (PDCCH) and the configuration signaling is a downlink control information (DCI) signaling, the target receiving beam is a receiving beam for a reference signal corresponding to a target TCI state, and the target TCI state is a TCI state of the target TCI group indicated by the configuration signaling.

17. The base station according to claim 16, wherein before transmitting the activation signaling to the terminal, the processor is further configured to:
   transmit, through a target RRC signaling, a TCI state correspondence table to the terminal, wherein the TCI state correspondence table comprises a correspondence between a TCI state identifier and a signal identifier, the TCI state identifier comprises a state identifier of each TCI state, and the signal identifier comprises an identifier of a reference signal for a current TCI state.

18. The base station according to claim 17, wherein the target RRC signaling further comprises grouping indication information, the grouping indication information indicating a TCI group corresponding to each TCI state identifier in the TCI state correspondence table.

19. The base station according to claim 16, wherein in transmitting the activation signaling to the terminal, the processor is further configured to:
   transmit, to the terminal, the activation signaling which indicates whether all TCI states of each TCI group are activated.

20. The base station according to claim 16, wherein in transmitting the configuration signaling to the terminal, the processor is further configured to:
   determine a serial number corresponding to each TCI state of the target TCI group by sorting all TCI states of the target TCI group in an ascending order of TCI state identifiers;
   determine a target serial number corresponding to the target TCI state; and
   transmit, to the terminal, the configuration signaling carrying the target serial number.

* * * * *